United States Patent
Rune et al.

(10) Patent No.: US 12,267,138 B2
(45) Date of Patent: Apr. 1, 2025

(54) FIRST NODE, WIRELESS DEVICE AND METHODS PERFORMED THEREBY, FOR HANDLING BEAMFORMING BEAMS

(71) Applicant: Telefonaktiebolaget LM Ericsson (publ), Stockholm (SE)

(72) Inventors: Johan Rune, Lidingö (SE); Andreas Reial, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 399 days.

(21) Appl. No.: 17/621,784

(22) PCT Filed: Jun. 28, 2019

(86) PCT No.: PCT/SE2019/050643
§ 371 (c)(1),
(2) Date: Dec. 22, 2021

(87) PCT Pub. No.: WO2020/263147
PCT Pub. Date: Dec. 30, 2020

(65) Prior Publication Data
US 2022/0247474 A1 Aug. 4, 2022

(51) Int. Cl.
*H04B 7/06* (2006.01)
*H04B 7/024* (2017.01)
(Continued)

(52) U.S. Cl.
CPC .......... *H04B 7/0695* (2013.01); *H04B 7/024* (2013.01); *H04B 7/0408* (2013.01);
(Continued)

(58) Field of Classification Search
CPC ........ H04B 7/0408; H04B 7/0608–061; H04B 7/088; H04B 7/0897; H04B 7/024;
(Continued)

(56) References Cited

U.S. PATENT DOCUMENTS 8,929,322 B1 * 1/2015 Kludt .................. H01Q 3/2617
                                                         370/329
9,408,095 B2 * 8/2016 Lightstone ............ H04W 72/23
(Continued)

FOREIGN PATENT DOCUMENTS

| WO | 2016198123 A1 | 12/2016 |
| WO | 2018063069 A1 | 4/2018 |
| WO | 2018093315 A1 | 5/2018 |

OTHER PUBLICATIONS

International Search Report and Written Opinion dated Apr. 8, 2020 for International Application No. PCT/SE2019/050643 filed Jun. 28, 2019, consisting of 13-pages.

*Primary Examiner* — Brendan Y Higa
(74) *Attorney, Agent, or Firm* — Weisberg I.P. Law, P.A.

(57) ABSTRACT

A method performed by a node, for handling beamforming beams. The node operates in a wireless communications network. The node establishes that at least two beams in a first set of beams transmitted by one or more first radio network nodes are overlapping. The establishing is based on information comprising at least one of: i) a first indication of a first result of one or more measurements performed by one or more wireless devices on the first set of beams, and ii) a report having a second result of a determination that the at least two beams in the first set of beams are overlapping. The node also provides a second indication to at least one of: the node, the one or more second radio network nodes, and the one or more wireless devices. The second indication is based on the established overlap.

10 Claims, 8 Drawing Sheets

(51) Int. Cl.
*H04B 7/0408* (2017.01)
*H04W 16/28* (2009.01)
*H04W 24/10* (2009.01)

(52) U.S. Cl.
CPC ......... *H04B 7/0617* (2013.01); *H04B 7/0619* (2013.01); *H04W 16/28* (2013.01); *H04W 24/10* (2013.01)

(58) Field of Classification Search
CPC ...... H04B 7/0617–0619; H04B 7/0621; H04B 7/0632; H04B 7/0695–06968; H04B 17/309–364; H04W 16/28; H04W 24/00; H04W 24/02; H04W 24/08; H04W 24/10; H04W 72/046; H04W 36/058; H04W 36/085
See application file for complete search history.

(56) References Cited

U.S. PATENT DOCUMENTS

| | | | | |
|---|---|---|---|---|
| 9,634,750 | B2* | 4/2017 | Kwak | H04B 7/0695 |
| 10,277,338 | B2* | 4/2019 | Reial | H04W 16/28 |
| 10,505,618 | B2* | 12/2019 | Guo | H04B 7/0408 |
| 11,006,338 | B2* | 5/2021 | Engström | H04W 16/28 |
| 2010/0214939 | A1* | 8/2010 | Ryan | H04W 24/08 |
| | | | | 370/252 |
| 2013/0229940 | A1* | 9/2013 | Baker | H04W 24/02 |
| | | | | 370/252 |
| 2017/0054534 | A1* | 2/2017 | Sang | H04L 5/0032 |
| 2017/0208494 | A1 | 7/2017 | Moon et al. | |
| 2017/0318491 | A1 | 11/2017 | Chen et al. | |
| 2018/0062770 | A1* | 3/2018 | Reial | H04B 7/063 |

* cited by examiner a)

b)

a)

b)

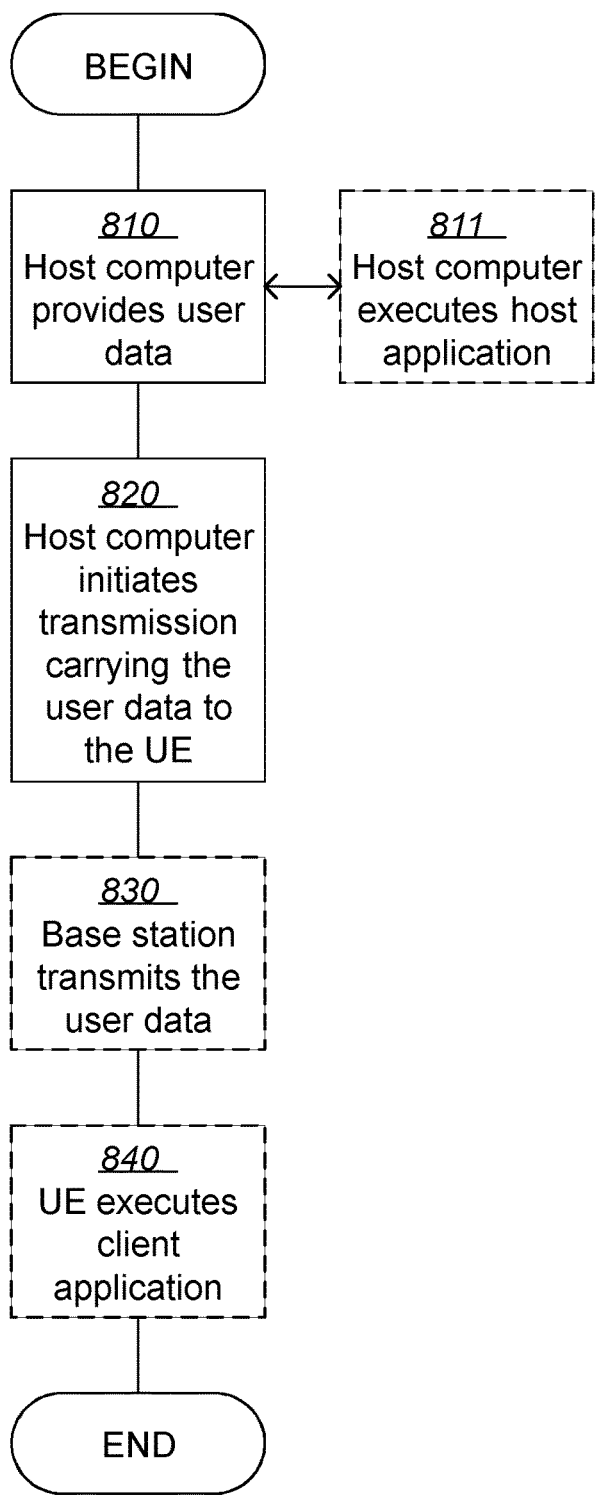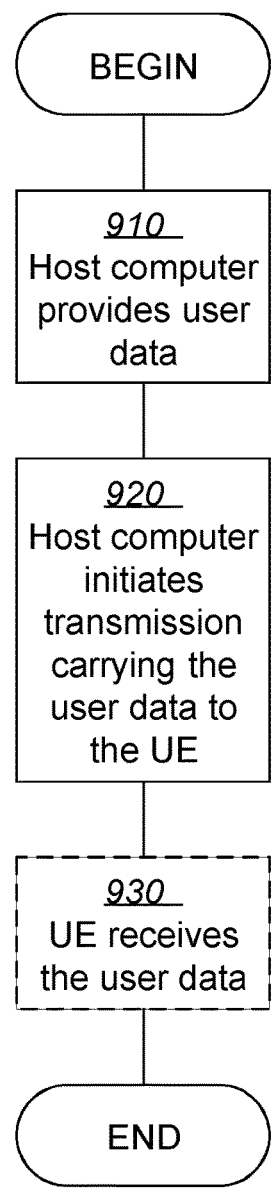
FIG. 8
FIG. 9

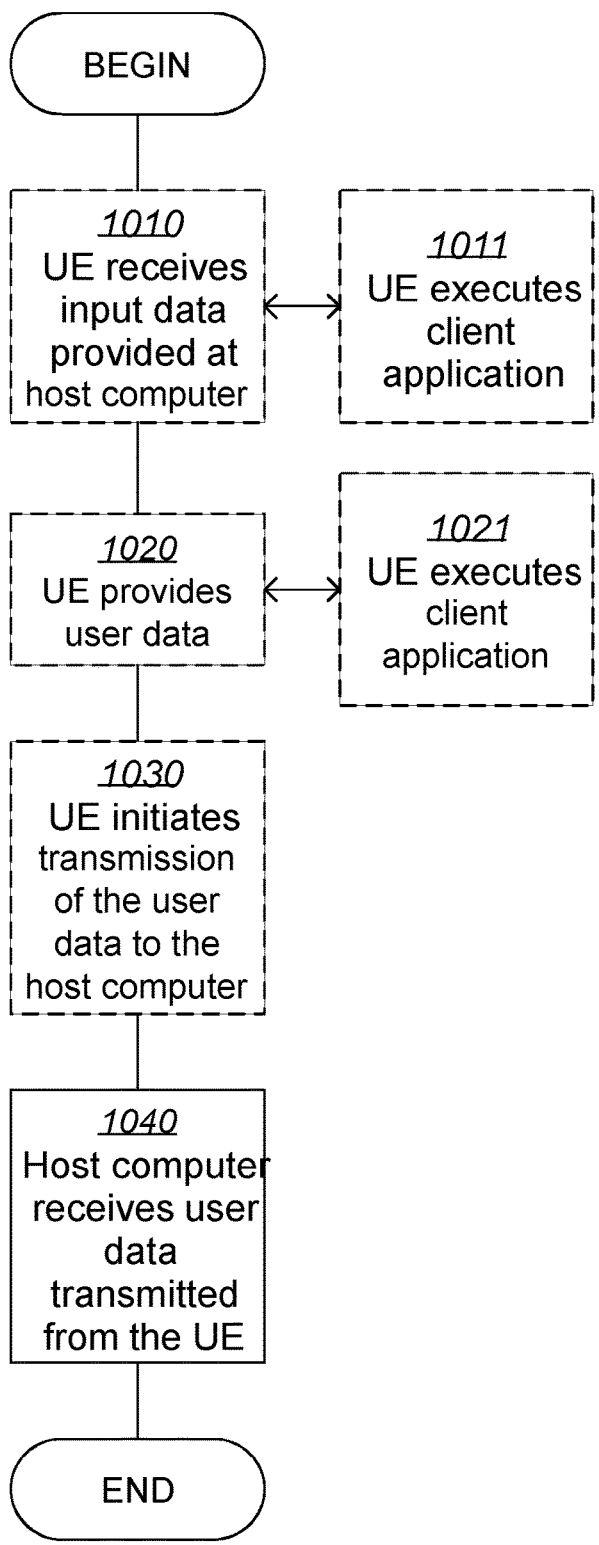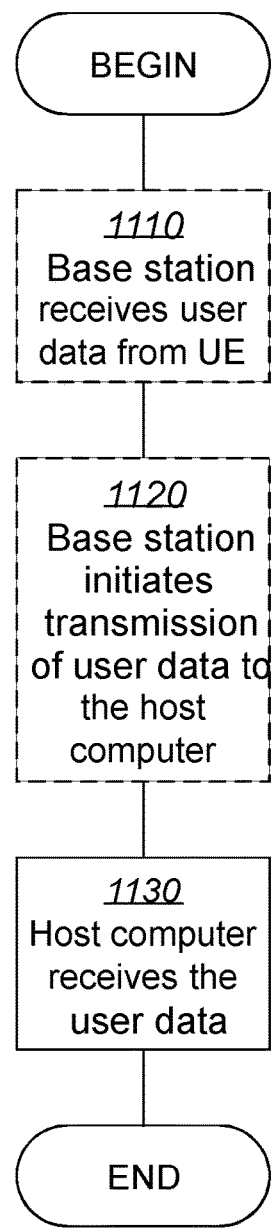
FIG. 10
FIG. 11

FIRST NODE, WIRELESS DEVICE AND METHODS PERFORMED THEREBY, FOR HANDLING BEAMFORMING BEAMS

CROSS-REFERENCE TO RELATED APPLICATION

This application is a Submission Under 35 U.S.C. § 371 for U.S. National Stage Patent Application of International Application Number: PCT/SE2019/050643, filed Jun. 28, 2019 entitled "FIRST NODE, WIRELESS DEVICE AND METHODS PERFORMED THEREBY, FOR HANDLING BEAMFORMING BEAMS," the entirety of which is incorporated herein by reference.

TECHNICAL FIELD

The present disclosure relates generally to a first node and methods performed thereby for handling beamforming beams. The present disclosure also relates generally to a wireless device and methods performed thereby for handling beamforming beams.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, MTC-type devices, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. Similarly, 5G NR networks and gNodeBs may be considered. In the context of this disclosure, the expression Downlink (DL) may be used for the transmission path from the base station to the wireless device. The expression Uplink (UL) may be used for the transmission path in the opposite direction i.e., from the wireless device to the base station.

Beam-Based Transmission in Modern Cellular Systems

Due to the scarcity of available spectrum for future wireless communication systems, spectrum located in very high frequency ranges, compared to the frequencies that have so far been used for wireless communication, such as 10 GHz and above, are planned to be utilized for future mobile communication systems, e.g., 5th Generation (5G), including the 5G system being standardized by 3GPP, for which the Radio Access Network part is referred to as New Radio (NR), and the core network part is referred to as Next Generation Core (NGC).

For such high frequency spectrum, the atmospheric, penetration and diffraction attenuation properties may be much worse than for lower frequency spectrum. In addition, the receiver antenna aperture, as a metric describing the effective receiver antenna area that collects the electromagnetic energy from an incoming electromagnetic wave, is inversely proportional to the frequency, and consequently, the link budget may be worse for the same link distance even in a free space scenario, if omnidirectional receive and transmit antennas are used. This may motivate the usage of beamforming to compensate for the loss of link budget, resulting in poor Signal to Noise Ratio/Signal to Interference plus Noise Ratio (SNR/SINR), in high frequency spectrum. Beamforming may be used at the transmitter, at the receiver, or both. In a large part of the spectrum planned for 5G deployments, the preferred configuration is to use a large antenna array at the Access Node (AN), e.g., gNB, Transmission/Reception Point (TRP), eNB, and a smaller number of antennas at the UE. The large antenna array at the AN may be understood to enable high-order transmit beamforming in the downlink.

For the above reasons, 5G systems are expected to make heavy use of high-gain, narrow beamforming, which may enable high data rate transmission coverage, also to very distant users which would not realistically be covered with normal sector-wide or omnidirectional beams, which may be understood to have lower antenna gain.

High or medium gain beamforming has traditionally mostly been used to increase the achievable data rates for individual UEs. However, for 5G/NR, beamforming may be used also for common control signaling, i.e., control signal transmissions that are not targeting a specific UE, but may be understood to be intended to be received by all or a group of UEs in the coverage area. Such common control signaling may include e.g., synchronization signals, broadcast system information, paging and reference signals. Since these common control signals may need to cover a larger area than a single beam may cover, typically a cell, they may be expected to be transmitted using beam sweeping, i.e., transmitting the signal in one beam at a time, sequentially changing the direction and coverage area of the beam until the entire intended coverage area, e.g., the cell, has been covered by the transmission. The beams in a beam sweep may cover contiguous areas, but typically their respective coverage areas may partly overlap with each other to reduce the risk of parts of the cell being uncovered, coverage holes.

Partial beam sweeping may also be performed, e.g., when reference signals, such as Channel State Information Reference Signals (CSI-RS), may be transmitted to support handover of a UE from one cell to another, in which case the network (gNB) may have a reasonable estimation of the location of the UE and therefore may select a subset of the possible beams to transmit the reference signal in. Beamforming of reference signals may also be used for refinement of a UE specific beam, which may be regarded as a part of link adaptation, involving transmitting reference signals close to the UE's current beam to let the UE provide feedback to the network (gNB) about which of the transmissions it receives with the best quality.

In order to enable efficient procedures for e.g., mobility and beam management in systems with many beams per node, a beam relations database may be established that may use e.g., UE measurement reports for different beams from a large number of terminals over time. The database may define a list of likely additional, or mobility candidate, beams for a UE that currently has a certain serving beam. In more detailed implementations, the database may provide a list of beams with sufficient reception quality for UEs in different physical locations in the network (NW). The lists may then be used for e.g., selectively turning on certain beams' reference signal (RS) for a given UE to perform mobility measurements, while most of the beams in the cell or a cell neighborhood may remain off, and the UE may be configured to perform a subset of all possible measurements to save computational resources and power. Related material has been presented e.g., in WO2016/198123, WO2018/063069 and WO2018/093315.

Synchronization Signal Block (SSB)

An important example of a beam swept common control signal in NR is the Synchronization Signal (SS) Block (SSB). In RRC_IDLE or RRC_INACTIVED state, a UE may use measurements on received SSB transmissions to select which cell to camp in and when to reselect to another cell.

In New Radio (NR), a Synchronization Signal (SS) Block (SSB) may consist of time-division multiplexed components, each with the duration of one symbol as follows: (a) Primary Synchronization Signal (PSS), (b) Physical Broadcast Channel denoted PBCH, (c) Secondary Synchronization Signal (SSS) and finally (d) PBCH. PBCH may carry a small part of the system information, sometimes referred to as the Master Information Block (MIB). The PSS+PBCH+SSS+PBCH structure is denoted SS Block (SSB).

Depending on the deployment, beamforming may be used to distribute the SSB over the coverage area of a cell. Each SSB instance may be beamformed in a certain direction, either to ensure coverage, or to provide beam finding support for subsequent link establishment. For improving coverage, or beam finding, the SS Block may be transmitted using beam sweeping, where the SSBs may be transmitted sequentially through a pre-determined set of beams that together may cover the desired area.

The SSBs in a beam sweep form what is called a SS Burst Set. The maximum number of SSBs in an SS Burst Set, i.e., in an SSB beam sweep, denoted "L", may depend on the carrier frequency, f, as follows:

L=4 for f<3 GHz
L=8 for 3 GHz<f<6 GHz
L=64 for 6 GHz<f<52.6 GHz

In System Information Block 1 (SIB1) of the broadcast system information, it may be indicated how many, up to L, SSBs are included in an SS Burst Set in the cell and also their relative timing. The latter may be indicated by a bitmap in the ssb-Positions/nBurst Information Element (IE). The bitmap to include in the ssb-Positions/nBurst IE may be a choice between three bitmaps of different sizes: shortBitmap (4 bits), mediumBitmap (8 bits) and longBitmap (64 bits). The shortBitmap may need to be chosen when the carrier frequency is f<3 GHz, the mediumBitmap may need to be chosen when the carrier frequency is 3 GHz<f<6 GHz and the longBitmap may need to be chosen when the carrier frequency is f>6 GHz. The bits in these bitmaps may represent the "SSB positions", which in turn may represent all the L SSBs that may potentially be transmitted on the current cell's carrier frequency, also called "candidate SSBs". For these candidate SSBs, which all may be represented in the bitmaps, a bit set to 1 may indicate that the corresponding candidate SSB is transmitted, and a bit set to 0 may indicate that the candidate SSB is not transmitted, i.e. that the SSB position is unused. The following is the ASN.1 definition of the ssb-Positions/nBurst IE:

```
ssb-PositionsInBurst    CHOICE {
   shortBitmap          BIT STRING (SIZE (4)),
   mediumBitmap         BIT STRING (SIZE (8)),
   longBitmap           BIT STRING (SIZE (64))
}                                               OPTIONAL, --
                                                Cond
AbsFreqSSB
```

Each candidate SSB, or SSB position, may be associated with an index, herein referred to as "SSB index", "candidate SSB index", "SSB position index", "SSB beam index", or "beam index", which is unique within a half-frame. For carrier frequencies <6 GHz, the SSB index may be indicated by the Demodulation Reference Signal (DMRS) of the PBCH. There may be 8 different DMRS sequences that may be used for the PBCH transmissions, and each of them may map to 2 index bits, for carrier frequencies <3 GHz, i.e. L=4, or 3 index bits, for carrier frequencies 3 GHz<f<6 GHz, i.e. L=8. For carrier frequencies 6 GHz<f<52.6 GHz, i.e., L=64, the DMRS of the PBCH may indicate the 3 LSB bits of the SSB index and the 3 MSB bits may be indicated by three payload bits in the PBCH, which may not be considered as part of the MIB. It may be considered important to note that the beam indexes may be associated with the SSB positions/candidate SSBs, which may be more than the actually transmitted SSBs. The following is an example to illustrate this. In this example, the maximum number of SSBs in an SS Burst Set, L, is L=8, i.e., the carrier frequency is between 3 GHz and 6 GHz. Hence, the ssb-Positions/nBurst IE may contain the mediumBitmap parameter.

mediumBitmap=11001011

As may be seen from the above mediumBitmap value, only 5 out of 8 possible candidate SSBs may actually be transmitted. Note that these 5 SSB beams may still be assumed to together cover the entire intended coverage area, e.g., a cell. The beam indexes associated with the candidate SSBs/SSB positions in the mediumBitmap bitmap may be 0, 1, 2, 3, 4, 5, 6, 7. Since, counting from the left, the two first, the fifth, the sixth and the seventh bits are set to one, and the corresponding SSB beams are transmitted, the actually transmitted SSB beams have beam indexes 0, 1, 4, 6 and 7. Hence, the SSB beams covering the intended coverage area, e.g., a cell, do not necessarily have sequential, that is, contiguously incremented, beam indexes, but may have gaps in the beam index sequence. Still, the mapping between beam indexes and SSB beam transmission order may be considered unambiguous thanks to the bitmap in the ssb-PositionsInBurst IE, i.e., shortBitmap, mediumBitmap or longBitmap.

The 10-bit System Frame Number (SFN) may be indicated by 6 bits in the MIB, complemented by four payload bits in the PBCH, which are not considered as part of the MIB. An additional PBCH payload bit, not considered as part of the MIB, may indicate the half-frame.

It has been agreed in the 3GPP meetings that the Secondary Synchronization Signal (SSS) and the Demodulation Reference Signal (DMRS) of the PBCH may be used for Downlink (DL) based RRM measurement for a UE in RRC_IDLE or RRC_INACTIVE state. In other words, a UE in RRC_IDLE or RRC_INACTIVE state may perform cell selection and cell re-selection based on measurements on the SS Blocks associated with the cells.

Radio transmissions may be subject to reflections, diffraction and blocking, depending on objects located in the transmission path. Such phenomena may affect both the direction and the power of the transmission, such that existing methods of handling beamforming beams may lead to unnecessary and/or erroneous measurements, which in turn result in waste of processing and energy sources, unnecessary signalling overhead, and increased latency.

SUMMARY

It is an object of embodiments herein to improve the handling of beamforming in a wireless communications network.

According to a first aspect of embodiments herein, the object is achieved by a method, performed by node. The method is for handling beamforming beams. The node operates in a wireless communications network. The node establishes that at least two beams in a first set of beams transmitted by one or more first radio network nodes operating in the wireless communications network are overlapping. The establishing is based on information comprising at least one of: a first indication and a report. The first indication is of a first result of one or more measurements performed by one or more wireless devices on the first set of beams. The report comprises a second result of a determination that the at least two beams in the first set of beams are overlapping. The node provides a second indication to at least one of the node, the one or more second radio network nodes, and the one or more wireless devices. The second indication is based on the established overlap.

According to a second aspect of embodiments herein, the object is achieved by a method, performed by a wireless device. The wireless device operates in the wireless communications network. The wireless device receives, from a network node operating in the wireless communications network or from a memory within the wireless device, a configuration. The configuration is to send information to the network node. The configuration comprises at least one of: one or more second rules, one or more third rules, and one or more fourth rules. The one or more second rules are on how to determine that at least two beams in a first set of beams to be transmitted by one or more radio network nodes operating in the wireless communications network are overlapping. The one or more third rules are on what elements information to be sent to the network node is to comprise. The information is to comprise a report comprising a second result of a determination, by the wireless device, on whether or not the at least two beams in the first set of beams are overlapping. The one or more fourth rules are on when to send the information to the network node. The wireless device also sends the information to the network node, based on the received configuration.

According to a third aspect of embodiments herein, the object is achieved by a node for handling beamforming beams. The node is configured to operate in the wireless communications network. The node is further configured to establish that at least two beams in the first set of beams configured to be transmitted by one or more first radio network nodes configured to operate in the wireless communications network are overlapping. The establishing is configured to be based on information configured to comprise at least one of the first indication and the report. The first indication is of the first result of the one or more measurements configured to be performed by the one or more wireless devices on the first set of beams. The report is configured to comprise the second result of the determination that the at least two beams in the first set of beams are overlapping. The node is also configured to provide the second indication to at least one of: the node, the one or more second radio network nodes, and the one or more wireless devices. The second indication is configured to be based on the overlap configured to be established.

According to a fourth aspect of embodiments herein, the object is achieved by the wireless device. The wireless device is for handling beamforming beams. The wireless device is configured to operate in the wireless communications network. The wireless device is further configured to receive, from the network node configured to operate in the wireless communications network, or from the memory within the wireless device the configuration. The configuration is to send information to the network node. The configuration is configured to comprise at least one of: the one or more second rules, the one or more third rules, and the one or more fourth rules. The one or more second rules are on how to determine that at least two beams in a first set of beams configured to be to be transmitted by one or more radio network nodes configured to operate in the wireless communications network are overlapping. The one or more third rules are on what elements information to be sent to the network node is to comprise. The information is to comprise the report comprising the second result of the determination, by the wireless device, on whether or not the at least two beams in the first set of beams are overlapping. The one or more fourth rules are on when to send the information to the network node. The wireless device is further configured to send the information to the network node, based on the configuration configured to be received.

According to a fifth aspect of embodiments herein, the object is achieved by a computer program, comprising instructions which, when executed on at least one processor, cause the at least one processor to carry out the method performed by the node.

According to a sixth aspect of embodiments herein, the object is achieved by a computer-readable storage medium, having stored thereon the computer program, comprising instructions which, when executed on at least one processor, cause the at least one processor to carry out the method performed by the node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the node establishing that the at least two beams in the first set of beams are overlapping, the node may learn the actual situation of beam overlaps, as they may be perceived by receiving wireless devices. Based on this, the node may provide the second indication and thereby be enabled to make more appropriate and well-founded choices of beams to activate in cases where only a subset of the available beams may need to be activated. For example, using the beam overlap information, the node may select an efficient set of beams which together cover the desired continuous coverage area. This may allow a minimum amount of RS transmissions and measurements for handover or for support of beam refinement. The node may be further enabled to facilitate modification and adaptation of the beamforming configurations used for SSB beams and/or CSI-RS beams, or other beamformed reference signal transmissions, so that more optimal coverage patterns may be achieved.

BRIEF DESCRIPTION OF THE DRAWINGS

Examples of embodiments herein are described in more detail with reference to the accompanying drawings, according to the following description.

FIG. 8 is a flowchart depicting embodiments of a method in a communications system including a host computer, a base station and a user equipment, according to embodiments herein.

FIG. 9 is a flowchart depicting embodiments of a method in a communications system including a host computer, a base station and a user equipment, according to embodiments herein.

FIG. 10 is a flowchart depicting embodiments of a method in a communications system including a host computer, a base station and a user equipment, according to embodiments herein.

FIG. 11 is a flowchart depicting embodiments of a method in a communications system including a host computer, a base station and a user equipment, according to embodiments herein.

DETAILED DESCRIPTION

Figure 1:
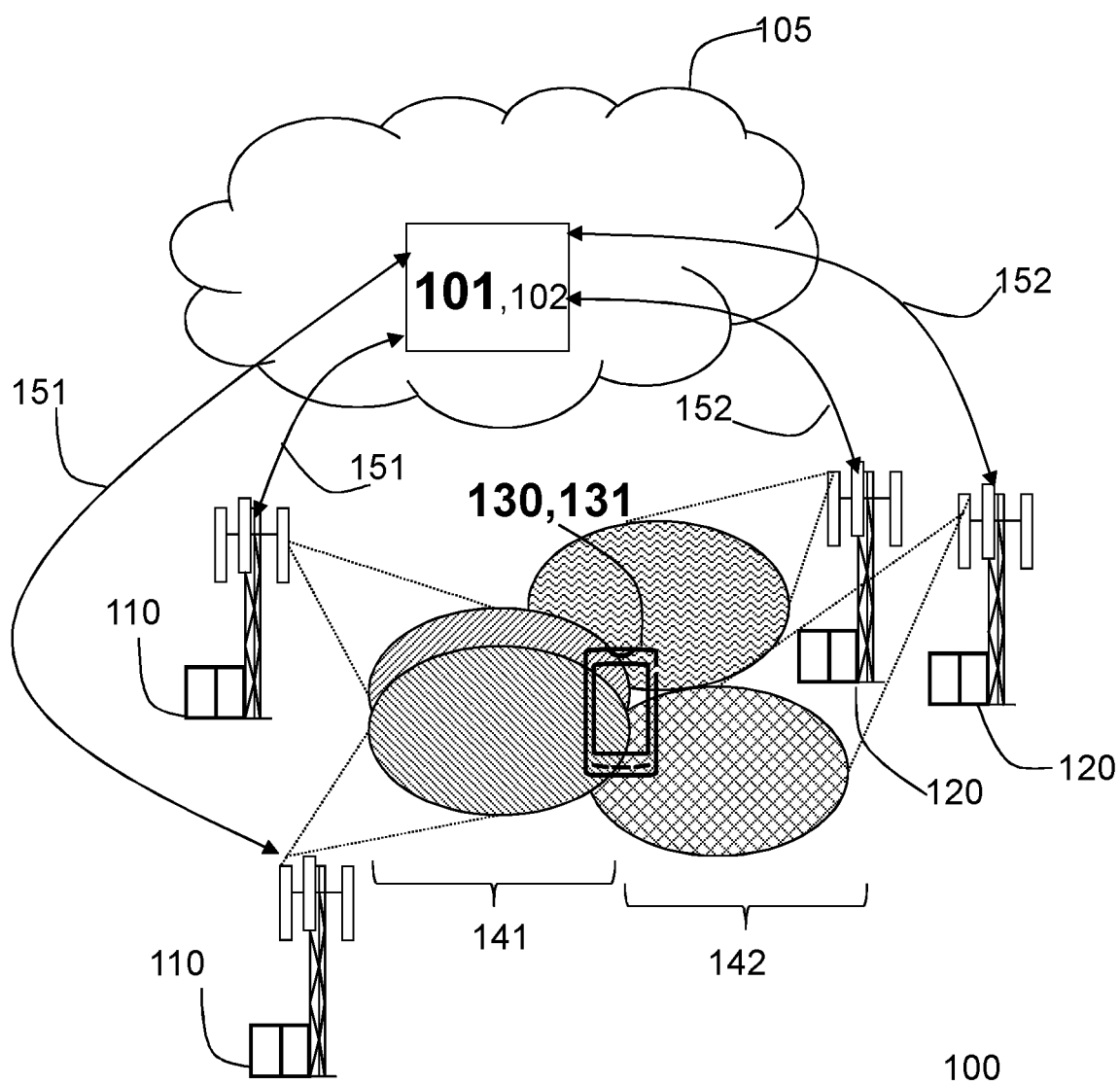
FIG. 1 is a schematic diagram an example of a wireless communications network, according to embodiments herein.

As part of developing embodiments herein, certain challenge(s) that currently exist which may be associated with use of at least some of the existing methods, will first be identified and discussed.

As mentioned earlier, radio transmissions may be subject to reflections, diffraction and blocking, depending on objects located in the transmission path. Such phenomena may affect both the direction and the power of the transmission.

As a result, a beam transmitted "logically adjacently" to another beam may not be received as a physically adjacent or partly overlapping beam, and may not be received at all, by a UE. Here, "logical adjacency" may be understood to refer to the property that two beams are transmitted with beamforming configurations that may make them cover adjacent/contiguous or partly overlapping areas in a free space transmission scenario. Similarly, a beam transmitted in a different direction than another beam, even in the opposite direction, may reach a UE as a physically adjacent or partly or fully overlapping beam.

While the beam relations database may be used to keep track of beam indices for beams that are physically adjacent, the neighbor or candidate set, currently there are no established methods for the network to obtain knowledge about situations where multiple beams overlap. In existing solutions, the NW generally assumes that e.g., a beam sweep or scan needs to be performed over all available beam configurations. However, if multiple beams overlap, it is generally suboptimal to activate all such beams for the purposes of e.g., mobility measurements. There is thus a need for a technical solution to avoid that the network/gNB selects suboptimal or incorrect beams due to unexpected beam overlap when transmitting reference signals to support handover or beam refinement.

Certain aspects of the present disclosure and their embodiments may provide solutions to these or other challenges. Embodiments herein may be generally understood to relate to handling beamforming beams. Particular embodiments herein may be understood to relate to reporting of detected overlapping non-adjacent beams.

As a summarized overview of embodiments herein, a node, e.g., a gNB, may learn which beams in its cell(s) may fully or partly overlap with each other using mobility or beam management measurement reports from UEs in the system and/or special beam overlap reporting from the UEs.

To detect overlapping beams, the network may utilize measurements and observations performed by UEs. In one class of embodiments, some UEs may be configured to measure SSB beams in RRC_IDLE and RRC_INACTIVE states, detect and record cases where beams substantially overlap with each other, and later report the recorded results to the network. Another class of embodiments may utilize UEs in RRC_CONNECTED state, measuring on either SSB beams or CSI-RS, or other reference signals, beams and reporting conventional quality metrics on multiple received beams, and/or additionally explicitly reporting instances of detected overlap.

From the point of view of the network, criteria for overlap detection may include consistently equal or equal-ratio quality metrics reported for two or more beams, or deriving individual beams' coverage areas from per-beam quality information coupled with physical positions of the reporting UEs. UEs may detect overlaps based on their measurements and report these overlaps to the network. Alternatively, or complementary, the network may detect overlaps based on beam measurement reports from a UE, which may preferably be confirmed by other UEs.

The measurement configurations, conventional or overlap detection-specific, may be conveyed to the UEs via dedicated signalling, e.g., RRC signaling when a UE is in RRC_CONNECTED state, or via the broadcast system information, for UEs in RRC_IDLE, RRC_INACTIVE and possibly RRC_CONNECTED state. Another possibility may be to use NAS signaling and let the core network, e.g., an Access and Mobility Function (AMF), control the configuration and report reception.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

FIG. 1 depicts a non-limiting example of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, 5G New Radio (NR) network in a similar variety of TDD/FDD and licensed/unlicensed carrier combination, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 also comprises a plurality of nodes, whereof a node 101 is depicted in the non-limiting example of FIG. 1. In some embodiments, the node 101 may be a network node 102. In other embodiments, the node 101 may be a wireless device, such as any of the one or more wireless devices 130 described below, such as e.g., the wireless device 131.

The network node 102 may be any kind of network node, which may comprise a radio network node, as described below, a core network node, e.g., a Mobility Management Entity (MME), Self-Organizing Network (SON) node, a coordinating node, positioning node, Evolved Serving Mobile Location Center (E-SMLC), Minimization of Drive Test (MDT) node, etc., or even an external node, e.g., a $3^{rd}$ party node, a node external to the current network, etc. In some particular embodiments, the network node 102 may be a radio network node, such as the one of the one of the one or more first radio network nodes 110 or one of the one or more second radio network nodes 120 described below. The network node 102, as that depicted in FIG. 1, may be a virtual node in the cloud 105. In some examples, the network node 102 may be a distributed node, and may perform its functions entirely on the cloud 105, or partially, in collaboration with a radio network node. In some embodiments, the network node 102 may be a network node managing one or more functions in any of the one or more first radio network nodes 110 or the one or more second radio network nodes 120 described below.

The wireless communications network 100 comprises a plurality of radio network nodes, whereof one or more first radio network nodes 110, and one or more second radio network nodes 120 are depicted in the non-limiting example of FIG. 1. Each of the one or more first radio network nodes 110 and the one or more second radio network nodes 120 may be understood to be a radio network node. That is, a transmission point such as a radio base station, for example a gNB, an eNB, or any other network node with similar features capable of serving a wireless device, such as a user equipment or a machine type communication device, in the wireless communications network 100. Any of the one or more first radio network nodes 110 and the one or more second radio network nodes 120 may support one or several communication technologies, and its name may depend on the technology and terminology used. In 5G/NR, any of the one or more first radio network nodes 110 and the one or more second radio network nodes 120 may be referred to as a gNB and may be directly connected to one or more core networks, which are not depicted in FIG. 1, but which, in some examples, may comprise the node 101. In LTE, any of the one or more first radio network nodes 110 and the one or more second radio network nodes 120 may be referred to as an eNB. Any of the one or more first radio network nodes 110 and the one or more second radio network nodes 120 may be of different classes, such as, e.g., macro base station, home base station or pico base station, based on transmission power and thereby also cell size. In other examples, which are not depicted in FIG. 1, any of the one or more first radio network nodes 110 and the one or more second radio network nodes 120 may be a distributed node, such as a virtual node in the cloud, and may perform its functions entirely on the cloud, or partially, in collaboration with a radio network node. Any of the one or more first radio network nodes 110 and the one or more second radio network nodes 120 may be understood to be enabled to serve receiving nodes, such as wireless devices, with serving beams, that is, using beamformed transmission where one of multiple possible beamforming configurations may be selected for a given wireless device or a given part of the coverage area.

The wireless communications network 100 covers a geographical area which may be divided into cell areas, wherein each cell area may be served by a radio network node, although, one radio network node may serve one or several cells. Cells are not depicted in the non-limiting example depicted FIG. 1, in order to simplify the Figure.

One or more wireless devices 130 are located in the wireless communication network 100, whereof a wireless device 131 is depicted in the non-limiting example of FIG. 1. The one or more wireless devices 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the one or more wireless devices 130 comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The one or more wireless devices 130 comprised in the wireless communications network 100 are enabled to communicate wirelessly in the wireless communications network 100. The communication may be performed e.g., via a RAN, and possibly the one or more core networks, which may comprised within the wireless communications network 100.

The node 101 may be configured to communicate within the wireless communications network 100 with any of the one or more first radio network nodes 110, respectively, over a first link 151, e.g., a radio link or a wired link. The node 101 may be configured to communicate within the wireless communications network 100 with any of the one or more second radio network nodes 120, respectively, over a second link 152, e.g., a radio link or a wired link. The one or more wireless devices 130 may be configured to communicate within the wireless communications network 100 with the one or more first radio network nodes 110 over a first set of beams 141, each of which being e.g., a radio link. The one or more wireless devices 130 may be configured to communicate within the wireless communications network 100 with the one or more second radio network nodes 120 over a second set of beams 142, each of which being e.g., a radio link. The one or more first radio network nodes 110 and the one or more second radio network nodes 120 may be configured to communicate within the wireless communications network 100, respectively, over e.g., a wired link or an X2 interface. This is not represented in the Figure to simplify it.

In general, the usage of "first" and/or "second" herein may be understood to be an arbitrary way to denote different elements or entities, and may be understood to not confer a cumulative or chronological character to the nouns they modify.

Any description herein provided for the wireless device 131 may be understood to equally apply, individually, to any other wireless device of the one or more wireless devices 130.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Embodiments of a method, performed by the node 101, will now be described with reference to the flowchart depicted in FIG. 2. The method is for handling beamforming beams. The node 101 is operating in the wireless communications network 100. As stated earlier, in some embodiments, the node 101 may be one of the one or more wireless devices 130, e.g., the wireless device 131.

In other embodiments, the node 101 may be the network node 102.

In some embodiments all the actions may be performed. In some embodiments, all actions may be performed. In FIG. 2, optional actions are indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

Action 201

The one or more first radio network nodes 110 operating in the wireless communications network 100 may transmit a first set of beams 141 during the course of communications in the wireless communications network 100. Embodiments herein may be understood to be drawn to enable the node 101 to learn which beams in each of its cell(s), or the cells serving it in the embodiments wherein the node 101 may be the wireless device 131, may be fully or partly overlapping with each other, so that the node 101, or one of the one or more first radio network nodes 110 or of the one or more second radio network nodes 120, e.g., a gNB, may then select appropriate beam(s) when beams which together form a continuous coverage may be needed, e.g. to support measurements for handover or to support measurements for beam refinement.

The term "overlap", as used herein, may be understood to refer to either partial or full overlap of the coverage areas of beams. Typically, it may be considered to be most important to detect instances of substantial overlap. Different formal criteria may be adopted, but for conceptual understanding, overlap may be visualized as e.g., the non-overlapping regions of two equal-sized beam coverage areas not exceeding 10% of the individual coverage areas. Alternatively, overlap may be visualized as a smaller beam coverage area falling completely or substantially within a larger beam coverage area. The coverage areas may be defined e.g., as areas with beam signal strength, e.g. measured as Signal to Noise Ratio (SNR), Signal to Interference plus Noise Ratio (SINR), Reference Signal Received Power (RSRP) or Reference Signal Received Quality (RSRQ), over a threshold.

To achieve this, the node 101 may utilize measurements and observations performed by the one or more wireless devices 130. In the particular embodiments wherein the node 101 is the wireless device 131, the node 101 may utilize its own measurements.

The one or more wireless devices 130 may be served by the one or more first radio network nodes 110, or be in their proximity, so that they may detect the first set of beams 141. Some wireless devices may be instructed to measure, detect and record cases where logically non-adjacent beams may overlap with each other, as will be described in further detail later. The recorded results may be later reported to the network, e.g., to the node 101.

In the embodiments wherein the node 101 may be the network node 102, in this Action 201, the node 101 may select the one or more wireless devices 130 that are to send information comprising at least one of: i) a first indication of a first result of one or more measurements performed by one or more wireless devices 130 on the first set of beams 141, and ii) a report comprising a second result of a determination that the at least two beams in the first set of beams 141 are overlapping.

The Selection

The one or more wireless devices 130 to take part in this information acquisition and reporting may be selected randomly or based on some property of the one or more wireless devices 130, such as wireless device category, type, class, classmark, the capabilities of the one or more wireless devices 130, the typical traffic pattern of the one or more wireless devices 130, the type of subscription associated with the Subscriber Identity Module/Universal Subscriber Identity Module (SIM/USIM) of the one or more wireless devices 130, or expected, or historical, frequency of network interaction, e.g., frequency of transitions from RRC_IDLE or RRC_INACTIVE state to RRC_CONNECTED state. The main approach may be to utilize wireless devices in RRC_IDLE and RRC_INACTIVE state measuring on Synchronization Signal Block (SSB) beams, but it may be also possible to utilize wireless devices in RRC_CONNECTED state, where these wireless devices may measure on either SSB beams or Channel State Information Reference Signals (CSI-RS), or other reference signal, beams.

With configuration via the system information, the selection of the one or more wireless devices 130 may be based on the one or more wireless devices 130 generating a random number or generating a number based on an identity of the wireless device, e.g., a UE identity, e.g., the 5G-S-Temporary Mobile Subscriber Identity (TMSI), 5G-Globally Unique Temporary Identity (GUTI) or the Subscription Permanent Identifier (SUPI), that may be compared with a parameter value in the configuration information, and depending on the result of the comparison, e.g., if the generated number of the one or more wireless devices 130 is smaller or greater than the parameter value in the configuration information in the system information, the one or more wireless devices 130 may be either selected or not selected for gathering and reporting measurement results in accordance with the configuration information in the system information. The selection of the one or more wireless devices 130 may also include other wireless device related information, such as classes or types of wireless devices, which may be selected for measurement and reporting or certain wireless device capabilities a selected wireless device may need to have. Other wireless device properties that may be indicated as selection parameters of the one or more wireless devices 130 may comprise fraction of time typically spent in RRC_IDLE/RRC_INACTIVE state, typical frequency of RRC connection establishment, and/or RRC connection resumption and/or typical traffic patterns. There may need to also be a way to turn off or on the beam overlap information acquisition and reporting feature. There may be an explicit indication accompanying the configuration information in the system information, which may indicate whether the feature is turned on or off. Alternatively, absence of the configuration information in the system information may mean that the feature is turned off, or simply not supported. Conveying this type of configuration information via the system information may be considered most suitable for wireless devices in RRC_IDLE and RRC_INACTIVE state, but it may also be considered as an option for configuring wireless devices to perform data collection and reporting in RRC_CONNECTED state.

The Beams

Any of beams in the first set of beams 141 and/or in the in the second set of beams 142 may be understood as beamforming beams, and may be referred to in this section collectively, as beams. In particular, the node 101 may learn of cases where "logically non-adjacent" beams, fully or partly, may be overlapping with each other. "Logically non-adjacent" may be understood to refer to the beam index associated with each beam in the SSB beam sweep, or corresponding information associated with CSI-RS/reference signal transmissions. Corresponding information in a CSI-RS, or other reference signal may be used by a RRC_CONNECTED wireless device in a similar way as SSB beam indexes may be used. Corresponding information in a CSI-RS or other reference signal may be understood as information in a CSI-RS or other reference signal which may indicate the order, sequence and/or adjacency, of the CSI-RS and/or reference signal transmission beams, or may indicate whether two beams in a free space transmission environment may cover contiguous or partially overlapping areas. Such information may be e.g., the bit-sequence in the CSI-RS and/or reference signal, the timing of the CSI-RS and/or reference signal transmission, that is, the time when the transmission was received, e.g., in the form of System Frame Number, slot number, within a frame, and/or Orthogonal Frequency Division Multiplex (OFDM) symbol number, within a slot, the transmission resource(s) of the CSI-RS and/or reference signal or any other transmission property associated with a certain beam transmission. Furthermore, for CSI-RS, the "CSI-RS resource" index may be used, where the node 101, e.g., as a gNB, may link the actual CSI-RS transmission parameters and beam configuration parameters to that resource index. Hence, "logically adjacent" and "logically non-adjacent" may be understood as terms associated with a property of the transmission of the signal, but which may be different at the receiver. Two SSB beams, whose respective beam indexes indicate that they follow each other sequentially in a beam sweep—and may have partially overlapping or contiguous coverage areas in a free space transmission environment—may be said to be "logically adjacent". The respective beam indexes may indicate this as derived from the ssb-Positions/nBurst IE in SIB1, the Demodulation Reference Signal (DMRS) of the Physical Broadcast Channel (PBCH) and, for carrier frequencies 6 GHz<f<52.6 GHz, that is, with the maximum number of SSBs L=64, three PBCH payload bits, see the section entitled "Synchronization Signal Block (SSB) in the Background section of this application.

Hence, in accordance with some embodiments herein, the one or more first radio network nodes 110, e.g., gNBs, may need to transmit the beams in an SS Burst Set, that is, an SSB beam sweep, so that two SSB transmissions following each other sequentially in time may be logically adjacent so that any of the one or more wireless devices 130 may determine logical adjacency from the beam index. Similarly, two CSI-RS and/or reference signal transmissions, whose respective associated information may indicate that they may have partially overlapping or contiguous coverage areas in a free space transmission environment may be said to be "logically adjacent". Potentially, it may also be possible for any of the one or more wireless devices 130 to measure on other beam swept common control signaling, such as system information or paging transmissions. This is not discussed further herein, but nevertheless it may be regarded as one of the possible options for all embodiments.

With that definition, logical beam adjacency may be derived from the beam index associated with each beam in the SSB beam sweep, or corresponding information associated with CSI-RS and/or reference signal transmissions. Provided that one of the one or more first radio network nodes 110, or one of the one or more second radio network nodes 120, transmits the beams in an SS Burst Set, that is, an SSB beam sweep, so that two SSB transmissions following each other sequentially in time are logically adjacent, any of the one or more wireless devices 130 may assume that two SSB beams, whose respective beam indexes, together with the ssb-Positions/nBurst IE, indicate that they follow each other sequentially in a beam sweep are logically adjacent and, hence, any of the one or more wireless devices 130 may determine logical adjacency from the beam index, together with the ssb-Positions/nBurst IE. Similarly, two CSI-RS and/or reference signal transmissions, whose respective associated information indicate that they would have partially overlapping or contiguous coverage areas in a free space transmission environment may be considered to be logically adjacent.

According to the foregoing, in some embodiments, the overlapping beams may be logically non-adjacent beams.

The One or More Measurements

The one or more measurements may comprise measurements of RSRP, RSRQ, SNR and/or SINR of the concerned beam transmissions. The measurements may be on Synchronization Signal Block (SSB) beams, but it may be also possible to measure on either SSB beams or Channel State Information Reference Signals (CSI-RS), or other reference signal, beams. As also stated earlier, potentially, it may also be possible for the one or more wireless devices 130 to measure on other beam swept common control signalling, such as system information or paging transmissions.

There may be several benefits from selecting the one or more wireless devices 130, that is, a subset of wireless devices in this Action 201 for providing the overlap-related information, as opposed to invoking all wireless devices in range. There may be many wireless devices in the cell, and receiving reports from all of them may not be necessary to create or track the overlap statistics. Invoking only a subset may be understood to reduce the additional processing load imposed on the wireless device population as a whole, and may provide an even, lower load per wireless device over time. It may also be understood to reduce the total reporting-related signalling back to the NW, so that excessive NW resource usage may be avoided. Furthermore, the selection process may allow the node 101 to invoke wireless devices that may have better overlap detection capability, better battery, or other power supply, resources, etc., thus optimizing the overlap detection performance versus impact tradeoff.

Action 202

As mentioned above, any of the one or more wireless devices 130 in RRC_IDLE and RRC_INACTIVE state may measure on SSB beams, detect and record cases where logically non-adjacent beams may overlap with each other. These wireless devices, e.g., the first wireless device 131, may later report their recorded results when they enter RRC_CONNECTED state, which may include cases of Tracking Area Update or Radio Access Network (RAN) based Notification Area Update. This may happen, either on request, e.g., after any of the one or more wireless devices 130 may have indicated the availability of measurement results concerning the current cell or radio network node, or the node 101, e.g., a gNB, may send the request anyway, opportunistically, to ask any of the one or more wireless devices 130 to report recorded relevant results, if any.

In the embodiments wherein the node 101 may be the network node 102, in this Action 202, the node 101 may, in some embodiments, configure, e.g., instruct, the one or more wireless devices 130 to send the information. The configuring in this Action 202 may comprise at least one of: i) one or more first rules on how to perform the one or more measurements on the first set of beams 141, ii) one or more second rules on how to determine that the at least two beams in the first set of beams 141 are overlapping, iii) one or more third rules on which elements are to be comprised in the first indication, the report or both, and iv) one or more fourth rules on when to send the information to the node 101.

The Configuration

The configuration may be performed by sending at least one of: system information and dedicated signalling. That is, the instructions may be conveyed to the one or more wireless devices 130 via dedicated signalling, e.g. RRC signaling when a wireless device is in RRC_CONNECTED state, or via the broadcast system information, for any of the one or more wireless devices 130 in RRC_IDLE, RRC_INACTIVE and possibly RRC_CONNECTED state.

The RRC protocol may be the preferable protocol to use for configuration of the measurements and reporting, as well as for the reporting of the results. The node 101 may use dedicated signaling to configure the one or more wireless devices 130. Several different RRC messages may be used for the configuration, e.g., RRCSetup, RRCResume, RRCReconfiguration, RRCRelease, RRCReestablishment or an RRC message corresponding to the LoggedMeasurementConfiguration message in LTE. A message corresponding to the LoggedMeasurementConfiguration message in LTE may seem suitable, at least for configuring data collection in RRC_IDLE and RRC_INACTIVE state, but no such message is specified for NR yet. In the RRCReconfiguration message, it may for instance go together with the configuration of regular RRM measurements. The RRCRelease message may be suitable, if the configuration is to be applied only in RRC_IDLE and/or RRC_INACTIVE state. Specifying a completely new message dedicated for this purpose may also be a possibility.

Another possibility is to convey the configuration to the one or more wireless devices 130 via the system information. If SIB1 is used, then the RRC message may be SIB1 message. For other SIBs, the RRC message is SystemInformation message.

As a last option, the configuration information may be specified in the standard. This may however not leave any room for choices and operator preferences, so a better option may probably be to use any of the dynamic ways of configuring the one or more wireless devices 130 described herein, but to allow absence of instructions, to trigger fallback to a standardized configuration. For instance, if the system information is used to convey dynamic configuration, then absence of configuration information in the system information may imply that the standardized configuration may need to be used. However, possibly there may instead be an explicit indication in the system information that the standardized configuration may need to be used, while complete absence of both the configuration information and the indication of use of the standardized configuration may mean that the beam overlap information acquisition and reporting feature is not used. Without this scheme, there may be no way of "turning off" the beam overlap information acquisition and reporting feature. If dedicated signaling is used to convey the configuration information, then the configuration information may be replaced by a simple indication that the any of the one or more wireless devices 130 may need to use the standardized configuration.

Irrespective of whether the beam overlap information acquisition and reporting feature is controlled by the core network, e.g., the AMF(s), or by the NG-RAN, that is, the radio network node or nodes, an additional layer of control may be provided by the Operation and Maintenance (O&M) system. The O&M system may initiate the feature by instructing selected radio network node or nodes or AMF(s) to activate the feature by selecting and configuring the one or more wireless devices 130 to begin the monitoring, detecting and reporting.

The One or More First Rules

With regards to the one or more first rules, these may comprise the one or more measurements to be performed, as described earlier, e.g., RSRP, RSRQ, etc. . . . . . Other information the configuration information may comprise e.g., start and stop times for the measurement period, area restrictions for the measurements, e.g., a list of cells, a Tracking Area or a RAN based Notification Area, and/or instructions of in which state(s) any of the one or more wireless devices 130 may need to pursue the quest for logically non-adjacent overlapping beams, that is, in RRC_CONNECTED state, in RRC_IDLE state, in RRC_INACTIVE state or any combination of these states.

The One or More Second Rules

Another important part of the configuration may be detailed instructions for the one or more measurements, in particular conditions, as specified in the one or more second rules, for when two beams may be regarded as overlapping and thus, if the beams are logically non-adjacent, recorded and reported as a case of overlapping logically non-adjacent beams. Such conditions may come in the form of one or more thresholds expressed in terms of strength and/or quality of the received transmissions. The thresholds may be configured in relation to measurements of RSRP, RSRQ, SNR and/or SINR of the concerned beam transmissions. As one option, there may be a single threshold, defining a maximum difference, in one or more of the mentioned strength or quality measures, between two beams in order to be considered a case of overlap, that is, a relative threshold. As another option, there may be one threshold which may be applied to both of the concerned beams, wherein the strength or quality of each of the concerned beams, may have to exceed the threshold in order for the beams to be considered as overlapping, that is, a minimum strength or quality threshold. As yet another option, the minimum strength and/or quality threshold may be combined with the above described relative threshold, applied to the strength and/or quality difference between the beams, wherein the strengths and/or qualities of both beams may have to exceed the minimum threshold and the strength and/or quality difference between the beams may have to be lower than the relative threshold in order for the two beams to be considered as overlapping. As yet another option, there may be two minimum thresholds, where the highest threshold may be applied to the strongest beam or the beam with the best quality and the lower threshold may be applied to the weakest beam or the beam with the worst quality. Each of the beams' strength and/or quality may have to exceed its respective threshold in order for the beams to be considered as overlapping. As yet another option, the two minimum thresholds may be combined with a relative threshold, wherein each of the beams' strength and/or quality may have to exceed its respective minimum threshold and the strength and/or quality difference between the beams may have to be lower than the relative threshold, in order for the beams to be considered as overlapping. In each of the above described options, any of the thresholds may be realized as multiple associated thresholds, wherein each of the multiple associated thresholds may be expressed in terms of a different one of the above-mentioned strength and/or quality measures, that is, for instance RSRP, RSRQ, SNR or SINR. For instance, as an example there may be two associated relative thresholds, one expressed in terms of RSRP and one expressed in terms of RSRQ. In order for the overlap condition to be fulfilled, the strength and/or quality difference between the concerned beams may have to be below both the associated relative thresholds in order for the overlap condition to be fulfilled. That is, the difference in RSRP between the two beams may need to be below the associated threshold expressed in RSRP, and the difference in RSRQ between the beams may need to be below the associated threshold expressed in terms of RSRQ. Instead of being provided to any of the one or more wireless devices 130 together with the other configuration information, the conditions for when two logically non-adjacent beams, or any other pair of beams, may need to be considered as overlapping may be specified in the standard.

The One or More Third Rules

With regards to the one or more third rules, the configuration information may need to also comprise instructions of the expected content of the reports any of the one or more wireless devices 130 may need to send to report the results. Examples of such content are described below. Absence of instructions of the report content may imply a default content, where the default content may be specified in standard specifications, or provided via the broadcast system information.

When any of the one or more wireless devices 130 may report recorded results, a reported case of overlapping logically non-adjacent beams may need to include information that identifies the concerned beams, e.g., beam indexes, or corresponding information associated with CSI-RS and/or reference signals, combined with the cell identity, e.g., the global cell identity, part of the global cell identity, e.g., omitting the Public Land Mobile Network Identifier (PLMN ID), e.g., the Mobile Country Code (MCC) and the Mobile Network Code (MNC), or the physical cell identity (PCI), of the concerned beams. The cell identity may optionally be omitted when the report is sent in the cell where the overlap case was detected. The report may also contain the actual measurement results, e.g., the measured quality of each of the overlapping logically non-adjacent beams. Further information that the report may contain include position information indicating where the overlap was detected, where the position information may have been obtained through a Global Positioning System (GPS) receiver, or some other Global Navigation Satellite System (GNSS) receiver in any of the one or more wireless devices 130, or using a network assisted position measurement method, e.g., using reference signals or other signals provided for the purpose of position measurements. Another piece of information that may be included in the report may be the time when the reported overlap was detected. It may be noted that multiple cases of overlapping logically non-adjacent beams may be included in the same report. To be prepared for reporting in accordance with the configured reporting instructions, any of the one or more wireless devices 130 may need to record all the information it may be expected to report for a case of logically non-adjacent beam overlap.

In accordance with its received reporting configuration, any of the one or more wireless devices 130 may include in a report only results concerning the current cells of the respective wireless device, e.g., the wireless device 131, or results concerning cells belonging to the current gNB of the respective wireless device, that is, the radio network node controlling the current cell of respective wireless device, or results concerning any cell irrespective of controlling radio network node, e.g. report all recorded results.

The One or More Fourth Rules

With regards to the one or more fourth rules, to facilitate for the node 101 to determine when it may be useful to request one of the one or more wireless devices 130 to report recorded results, any of the one or more wireless devices 130, e.g., the wireless device 131, may indicate availability of measurement results concerning the current cell or other cells controlled by the same radio network node, e.g., as indicated by the gNB Identifier (ID) in the broadcast system information. Any of the one or more wireless devices 130 may also have been instructed, via the one or more fourth rules, to report its results unsolicited when it enters RRC_CONNECTED state or periodically. Such unsolicited reporting may be on condition that the respective wireless device has recorded, yet unreported, relevant results for the current cell, or another cell controlled by the same radio network node. Yet another possible reporting configuration may be event-triggered reporting, e.g., upon entering, while in RRC_ CONNECTED state, a cell for which it may have recorded relevant, yet unreported, results, or entering a cell belonging to a radio network node which may control at least one other cell for which the respective wireless device may have recorded relevant, yet unreported, results. Another triggering event, or condition for reporting that may be e.g., comprised in the one or more fourth rules, may be e.g. that any of the one or more wireless devices 130, for its current cell, or for cells of its current radio network node, may have recorded a number of cases of logically non-adjacent beam overlaps which may exceed a preconfigured threshold.

RRC_CONNECTED wireless devices, e.g., the wireless device 131, may measure on SSB beams or reference signal beam transmissions, e.g. CSI-RS transmissions, detect and report cases where logically non-adjacent beams overlap with each other. These wireless devices may report recorded results immediately, or more or less immediately, on request, periodically or event-triggered. Yet another possibility is that the node 101 may request the wireless device 131 to report all the beams, e.g., SSB beams or CSI-RS beams, of the serving cell the wireless device 131 may hear at this moment in time.

The information provided to any of the one or more wireless devices 130 for configuration of the measurement and reporting may need to comprise rules for reporting, that is, the different reporting modes described above, comprising possible associated conditions or triggering events.

Action 203

In accordance with the foregoing, in the embodiments wherein the node 101 may be the network node 102, in this Action 203, the node 101 may receive the information from the one or more wireless devices 130. The information may indicate that the at least two beams in a first set of beams 141 are overlapping.

The receiving in this Action 203 may be implemented, for example, via any of the first set of beams 141, the second set of beams 142, the first link 151 or the second link 152.

Various RRC messages may be used for the reporting, depending on the type of reporting. If reporting unsolicited, event-triggered, periodic, preconfigured, etc., that is, without a prior explicit request from the node 101, reporting in conjunction with RRC connection establishment, the RRCSetupRequest message may be one possibility. However, since this message may need to be kept short, a better choice may be the RRCSetupComplete message. For unsolicited reporting in conjunction with RRC connection resumption, the RRCResumeRequest, RRCResumeRequest1 or RRCResumeComplete message may be used. For unsolicited reporting independently of, that is, not in conjunction with, RRC connection establishment and RRC connection resumption, the MeasurementReport message or a new message may be used. For any of the one or more wireless devices 130 collecting measurement data in RRC_CONNECTED state, the MeasurementReport message may be a suitable choice.

An alternative to using RRC signaling for the configuration and/or reporting may be to use Non-access stratum (NAS) signaling. Since NAS signaling may go between any of the one or more wireless devices 130 and the core network, specifically the AMF in the core network, this may be understood to mean that if the NAS signaling is used for conveying the configuration information to the any of the one or more wireless devices 130, the configuration may be performed by the core network, e.g., by the AMF. Hence, the feature may need to be controlled by the core network. The configuration information may be conveyed in conjunction with any of the existing NAS procedures, e.g., the Registration, corresponding to the Attach procedure in Evolved Packet System (EPS), the Service Request or Tracking Area Update procedure, but it may also be transferred at any time using a new or one of the existing NAS messages. Reporting may also be conveyed in an existing NAS message in any of the existing NAS procedures, e.g. the ones mentioned above, or using a new NAS message. An advantage of letting the core network control the beam overlap information acquisition and reporting feature is that this may make it easier to have a multi-cell, multi-radio network node view, that is, reported information related to multiple radio network nodes and cells may be managed. More information on the reported information may be found on Action 206.

In some embodiments wherein Action 201 may have been implemented, the information may be received from the selected one or more wireless devices 130.

Action 204

In the above, it has been assumed that the one or more wireless devices 130 may be configured to detect and report beam overlaps. However, another alternative may be that the node 101, e.g. a gNB or the wireless device 131, may detect the beam overlaps, based on beam measurement reports from the one or more wireless devices 130, which in the case of the node 101 being the wireless device 131 may be its own measurements and/or reports. If e.g., the wireless device 131 reports simultaneous beam measurements on two beams which imply that these two beams overlap, e.g., because both beams have simultaneously been measured above a certain signal strength level, then the node 101 may consider these beams as overlapping. Optionally, and preferably, the node 101 may need to refrain from concluding that two beams are overlapping based on a single measurement report from a single wireless device, but may need to preferably have this circumstance confirmed by measurement reports from multiple wireless devices, of the one or more wireless devices 130, before determining that the beams indeed overlap. This may be understood to apply to embodiments wherein the node 101 may be the network node 102.

In this Action 204, the node 101 establishes that at least two beams in the first set of beams 141 transmitted by one or more first radio network nodes 110 operating in the wireless communications network 100 are overlapping. The establishing 204 is based on the information comprising at least one of: i) the first indication of the first result of the one or more measurements performed by the one or more wireless devices 130 on the first set of beams 141, and ii) the report comprising the second result of the determination that the at least two beams in the first set of beams 141 are overlapping.

As mentioned above, one alternative is that the one or more wireless devices 130 are not configured to specifically report cases of beam overlap, but the node 101 itself may detect the overlaps based on regular per-beam measurement reports from the one or more wireless devices 130. With this embodiment, the regular configuration means in the RRM measurement framework may suffice for configuring wireless devices, of the one or more wireless devices 130, in RRC_CONNECTED state. If measurements performed by wireless devices in RRC_IDLE and RRC_INACTIVE state are to be used, then relevant parts of the above described configuration options may be needed. No conditions for beam overlap determination may have to be configured, but conditions for collection and reporting of measurement data may still be needed.

In some embodiments, the establishing may be based on one or more criteria selected from at least one of: a) a first level of similarity and b) a second level of similarity, as follows.

The first level of similarity may be in the first result of the one or more measurements obtained from the at least two beams within a first time period. From the network's point of view, in one "offline" overlap detection embodiment, criteria for beam overlap detection, in particular, the first level of similarity, may include consistently equal, e.g., a difference between them not exceeding a threshold, or equal-ratio quality metrics reported for two or more beams, as reported by large number of the one or more wireless devices 130 over time. The expression "level of similarity" is used herein to express that values, e.g., in this case of measurements, may be considered similar if an indication of their difference falls within a range. Namely, there may not be a single or unique value indicating similarity.

In another embodiment, the second level of similarity may be in coverage areas of each of the at least two beams, the coverage areas being derived according to the first result of the one or more measurements obtained from the at least two beams within a second time period, and a respective geographical position of the one or more first radio network nodes 110. In such embodiments, individual beams' coverage areas may be explicitly derived from per-beam quality information coupled with physical positions of the reporting one or more wireless devices 130, and subsequently compared for different beams. If there are e.g., equal, e.g., a difference between them not exceeding a threshold, or equal-ratio quality metric patterns are found for two beams over a large fraction of their coverage areas, overlap may be indicated.

The time of measurement collection of any of the first time period and/or the second time period may span hours, days, or longer, if relevant aspects of network configuration and relevant propagation characteristics do not change.

As an extension of some embodiments herein, combining beam quality measurement reports, beam overlap reports from any of the one or more wireless devices 130 or "offline" overlap estimates performed by the node 101, irrespective of whether the overlapping beams may be logically adjacent or non-adjacent, and optionally wireless device position information at the time of the measurements, the node 101 may be able to create a beam coverage map including all available beams.

The described online overlap measurement and reporting methods by the one or more wireless devices 130 may also allow estimating the extent of beam overlap, that is, the fraction of beam 1 coverage area that is covered by beam 2. The one or more wireless devices 130, or the node 101, may estimate this, e.g., by computing the fraction of measured quality metrics of beam 1 to which there exist corresponding metrics of beam 2, e.g., metrics exhibiting consistent values or ratios and/or differences. The overlap fraction may be reported by the any of the one or more wireless devices 130 in their respective beam overlap report. It may noted that the fractional coverage metric may generally not be symmetric between beams, especially concerning overlaps of beams belonging to different cells, especially when the effective coverage areas are not equally shaped and/or sized, especially when one beam coverage area may be fully enclosed within the coverage area of another beam. That is, even if the absolute size of the overlapping area may by definition be the same for two overlapping beams, this overlapping area may represent different fractions of the total coverage area of the respective overlapping beams.

The same fractional information may also be derived by the node 101 in the offline mode in a similar manner from reported beam measurements by many of the one or more wireless devices 130. The difference to the online mode may be understood to be that the measurement set may be more representative, including many wireless devices and a wider range of wireless device positions than a single wireless device may be able to explore.

Action 205

The reported information may be forwarded by the node 101, e.g., any of the one or more first radio network nodes 110 or AMF(s), to the O&M system for processing, refinement, analysis and determination of potential actions. Actions may involve changing of beam configurations in certain cells, e.g., to attempt to reduce the number of cases of overlapping logically non-adjacent beams, or instructing any of the one or more first radio network nodes 110 to adapt the selection of beams, e.g., CSI-RS transmissions, for support of handover or beam refinement. Operations involving changing of beam configurations may also be initiated autonomously by the node 101, as e.g., a radio network node, based on received reported information, without instruction from the O&M system. A less complex approach may however be to "accept" the situation, learn how the beams are perceived by the one or more wireless devices 130, which beams the one or more wireless devices 130 may perceive as neighbor beams, and act in accordance with this knowledge when selecting beams to activate, e.g., CSI-RS transmissions, e.g. for beam refinement of for support of handover.

As stated before, the information provided in reports from any of the one or more wireless devices 130 may enable the node 101, in the embodiments wherein the node 101 may be the network node 102, to make more appropriate and well-founded choices of beams to activate in cases where only a subset of the available beams may need to be activated. For example, using the beam overlap information, the node 101, as the network node 102, may select an efficient set of beams which together may cover the desired continuous coverage area. This may be understood to allow a minimum amount of RS transmissions and measurements for handover or for support of beam refinement.

In addition to aiding the node 101 in selection of appropriate beams to activate, e.g., in conjunction with measurements supporting handover, embodiments herein may potentially also facilitate modification and adaptation of the beamforming configurations used for SSB beams and/or CSI-RS beams, or other beamformed reference signal transmissions, so that more optimal coverage patterns may be achieved. For instance, if any of the one or more wireless devices 130 receives beam X when it is in the coverage of beam Y, and beam X and Y, are not logically adjacent with each other, then the node 101 may assume that there is a risk that at least one of beam X and Y is not appropriately covering the area it was intended to cover. If any of the one or more wireless devices 130 also receives another beam, which is logically adjacent to e.g., beam Y, then it may be considered quite likely that it is beam X which is diverted from its intended coverage area and which may benefit from having its beamforming parameters or transmit power modified. Similarly, if any of the one or more wireless devices 130 fails to receive a beam that is logically adjacent to one or two beams that it may receive, then this logically adjacent beam may be expected to be diverted or blocked and may benefit from having its beamforming parameters and/or transmit power modified. Alternatively, the beams that any of the one or more wireless devices 130 may detect as covering areas that are physically adjacent to, or partly overlap with, the area that the diverted or blocked beam may have needed to cover, may have their beamforming parameters and/or transmit power modified so that they compensate for the void of the diverted or blocked beam, e.g., so that they cover also the area which the diverted or blocked beam was intended to cover, and then the diverted or blocked beam may optionally be deactivated and/or turned off. Yet another alternative for adaptation of the beamforming coverage pattern, e.g. for the SSB beams, may be that reports of full or partial overlap between logically non-adjacent beams or reports of more general beam detection data may trigger a reconfiguration of all the involved beams, e.g., all the beams in an SSB beam, where the reconfiguration may involve modification of the beams' beamforming parameters, the beams' transmit powers and/or the number of beams used.

In the embodiments wherein the node 101 may be the network node 102, in accordance with the foregoing, in this Action 205, the node 101 may select a second set of beams 142 to be transmitted by one or more second radio network nodes 120. The selecting in this Action 205 may be based on the establishment that the at least two beams in the first set of beams 141 are overlapping, wherein one of the following options applies: i) the one or more second radio network nodes 120 are the same as the one or more first radio network nodes110; ii) one or more of the one or more second radio network nodes 120 are the same as the one or more first radio network nodes 110; iii) all of the one or more second radio network nodes 120 are different from the one or more first radio network nodes 110. Accordingly, the second set of beams 142 may correspond to the first set of beams 141, modified, according to one or more parameters, or to a different set of beams, completely, or at least in part.

Action 206

The radio network node controlling a certain cell may be understood to be indicated by the identifier of the radio network node, e.g., the gNB ID, in the system information broadcast in the cell. If the node 101 receives a report including information pertaining to cell(s) belonging to other radio network node or nodes, it may need to preferably distribute this information to the concerned radio network node or nodes.

Also, the node 101, as e.g., a core network, e.g., the AMFs, may distribute the reported information to the radio network nodes controlling the cells to which the reported information pertains, e.g., any of the one or more first radio network nodes 110 or the one or more second radio network nodes 120. This distribution may include inter-AMF transferring of the information in order to reach the concerned radio network node.

If the radio network nodes themselves control the beam overlap information acquisition and reporting feature, that is, a more distributed approach, then any of the one or more wireless devices 130 may be configured to only report information that concerns cells belonging to the current serving radio network node of the respective wireless device, that is, the radio network node controlling the cell the wireless device may be currently located in. Alternatively, information related to cells belonging to multiple radio network nodes, that is, multi-radio network node information, may be reported and each radio network node may then distribute received information concerning cells belonging to other radio network nodes to these other radio network nodes, as previously described, that is, via Xn interfaces, e.g., using additions to the XNAP protocol, or via dynamically established inter-radio network node connections or using multi-hop, via multiple radio network nodes, transfer or via the core networks, e.g., the AMF(s).

In accordance with the foregoing, in this Action 206, the node 101 provides a second indication to at least one of: the node 101, e.g., as an output, the one or more second radio network nodes 120, and the one or more wireless devices 130. The second indication may be based on the established overlap.

In particular embodiments, the node 101 as the first wireless device 131 may provide the second indication by sending it to at least one of: the node 101 and the one or more second radio network nodes 120, or by providing it to the first wireless device 131 itself, e.g., as an output for further processing.

In other particular embodiments, the node 101 as the network node 102 may provide the second indication to the node 101 itself, e.g., as an output for further processing, or by sending it at least one of the one or more second radio network nodes 120, and the one or more wireless devices 130.

The providing in this Action 206, e.g., the distribution, may be performed via Xn interfaces, e.g., using additions to the Xn Application Protocol (XNAP) protocol, or via dynamically established inter-radio network node connections or using multi-hop, via multiple radio network nodes, transfer, or via the core networks, e.g. the Access and Mobility Management function or functions (AMF(s).

As stated earlier, an advantage of letting the core network control the beam overlap information acquisition and reporting feature may be that this may make it easier to have a multi-cell, multi-radio network node view, that is, reported information related to multiple radio network nodes and cells may be managed.

Action 207

In the embodiments wherein the node 101 may be the network node 102, in accordance with the foregoing, in this Action 207, the node 101 may send a third indication to at least one of the one or more second radio network nodes 120 and the one or more wireless devices 130. The third indication may indicate the selected second set of beams 142.

The third indication may be e.g., an instruction to modify a power of transmission or to modify a coverage pattern for one or more of the beams in the second set of beams, or an instruction to the one or more wireless devices 130 to modify measurement configuration parameters or parameters related to overlap detection and reporting. The sending in this Action 206 may be implemented, for example, via an X2 interface, e.g., using additions to the Xn Application Protocol (XNAP) protocol, or via dynamically established inter-radio network node connections or using multi-hop, via multiple radio network nodes, transfer, or via the core networks, e.g. the Access and Mobility Management function or functions (AMF(s).

Embodiments of a method, performed by any of the one or more wireless devices 130, exemplified here as the wireless device 131, will now be described with reference to the flowchart depicted in FIG. 3. The method may be understood to be for handling beamforming beams. The wireless device 131 operates in the wireless communications network 100.

It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The detailed description of some of the following corresponds to the same references provided above, in relation to the actions described for the node 101, and will thus not be repeated here to simplify the description, however, it applies equally. For example, the one or more measurements may comprise measurements of RSRP, RSRQ, SNR and/or SINR of the concerned beam transmissions. As another example, in some embodiments, the overlapping beams may be logically non-adjacent beams.

Any reference herein to the network node 102, may be understood to refer to the embodiments wherein the node 101 is the network node 102.

Action 301

In this Action 301, the wireless device 131 receives, from the node 101, as a network node 102, operating in the wireless communications network 100, or from a memory within the wireless device 131, the configuration to send information to the node 101, the configuration comprising the at least one of: i) the one or more second rules on how to determine that at least two beams in a first set of beams 141 to be transmitted by the one or more radio network nodes 110 operating in the wireless communications network 100 are overlapping; ii) the one or more third rules on what elements the information to be sent to the network node 102 is to comprise, wherein the information is to comprise the report comprising a second result of a determination, by the wireless device 131, on whether or not the at least two beams in the first set of beams 141 are overlapping; and iii) the one or more fourth rules on when to send the information to the network node 102.

The configuration may be received as described earlier, namely, in some embodiments, the configuration may be received by receiving, from the network node 102, at least one of the system information and the dedicated signalling. For example, the configuration may be conveyed to the wireless devices 131 via dedicated signalling, e.g. RRC signaling when the wireless device 131 may be in RRC_CONNECTED state, or via the broadcast system information, when the wireless devices 131 may be in RRC_IDLE, RRC_INACTIVE and possibly RRC_CONNECTED state.

The receiving in this Action 301 may be implemented, for example, via any of the first set of beams 141, the second set of beams 142, the first link 151 or the second link 152.

In some embodiments, the information may comprise at least one of: i) the first indication of the first result of the one or more measurements performed by the wireless device 131 on the first set of beams 141, and ii) the report comprising the second result of the determination, by the wireless device 131, that the at least two beams in the first set of beams 141 are overlapping.

Action 302

In this Action 302, the wireless device 131 may perform the one or more measurements on the first set of beams 141 based on the received configuration.

Action 303

In this Action 303, the wireless device 131 may establish that the at least two beams in the first set of beams 141 are overlapping. The establishing in this Action 303 may be based on the received configuration and the performed one or more measurements. The establishing may be performed similarly to how it was described in Action 204.

In order to detect beam overlap during an ongoing visit to a cell, which may be referred to as "online" detection, the wireless device 131 may compare its measurement results for different beams in the cell over time, e.g., as it moves along the cell coverage area. The overlap detection may be therefore best performed by a non-stationary wireless device 131. In some examples, the wireless device 131 may indicate two beams as overlapping if their quality metrics have similar values over a large fraction of their coverage areas. In other examples, while the quality metrics for two overlapping beams may differ in terms of absolute values, the wireless device 131 may observe the ratios or differences of the quality metrics and may indicate two beams as overlapping if these difference or ratios have similar values over a large fraction of the beams' coverage areas. In yet other examples, the wireless device 131 may indicate overlap if the quality metrics for two beams exceed a predetermined threshold over a large fraction of the beams' coverage areas. In all these cases of "online" detection, it may be assumed that the measurement values that the wireless device 131 may compare, may be measured from the overlapping beams simultaneously.

The described online overlap measurement and reporting methods by the wireless device 131 may also allow estimating the extent of beam overlap, that is, the fraction of, e.g., beam 1 coverage area that may be covered by, e.g., beam 2. The wireless device 131 may estimate this, e.g., by computing the fraction of measured quality metrics of beam 1 to which there may exist corresponding metrics of beam 2, e.g., metrics exhibiting consistent values or ratios/differences. The overlap fraction may be reported by the wireless device 131 in its beam overlap report. It may be noted that the fractional coverage metric may generally not be symmetric between beams, especially concerning overlaps of beams belonging to different cells, especially when the effective coverage areas may not be equally shaped and/or sized, especially when one beam coverage area may be fully enclosed within the coverage area of another beam. That is, even if the absolute size of the overlapping area may by definition be the same for two overlapping beams, this overlapping area may represent different fractions of the total coverage area of the respective overlapping beams.

It may be understood that the foregoing description may also apply to the description of Action 203 in the embodiments wherein the node 101 is the wireless device 131.

Action 304

In this Action 304, the wireless device 131 sends the information to the network node 102, based on the received configuration.

The sending in this Action 304 may be implemented, for example, via any of the first set of beams 141, the second set of beams 142, the first link 151 or the second link 152.

Action 305

In this Action 305, the wireless device 131 may receive, based on the sent information, the third indication from the network node 102. The third indication may indicate the second set of beams 142 to be transmitted by the one or more second radio network nodes 120.

The receiving in this Action 305 may be implemented, for example, via any of the first set of beams 141, the second set of beams 142, the first link 151 or the second link 152.

As abbreviated overview of the foregoing in other words, embodiments herein may be understood to relate to utilizing wireless devices in RRC_IDLE and RRC_INACTIVE state or UEs in RRC_CONNECTED state to detect and report, e.g., to the network, cases of overlapping beams, so that, e.g., the network, may learn and use the actual beam coverage situation and, based on that, make more appropriate and well-founded choices of beams to activate in cases where only a subset of the available beams are activated, e.g., for support of handover or beam refinement.

A particularly important aspect of embodiments herein is that wireless devices may be configured to detect and report cases of overlapping logically non-adjacent beams, where two "logically adjacent" beams may be understood as two beams which are transmitted with beamforming configurations which may give them partially overlapping or contiguous coverage areas in a free space transmission environment.

From the network's perspective, some of the embodiments herein may comprise selecting a set of wireless devices, where the selection process may be distributed in time, configuring the selected wireless devices to detect and report cases of overlapping logically non-adjacent beams or cases of overlapping beams in general, receiving reports of overlapping logically non-adjacent beams or overlapping beams in general from the configured wireless devices.

Overlap information may be understood to allow the network to avoid covering the same region of the cell with multiple beams. Furthermore, from measurement reports and overlap instances, the network may be able to create a non-duplicate beam coverage map for the cell. Using the overlap and/or beam coverage map information, the network may be enabled to adapt subsequent selections of beams to activate in cases where only a subset of the available beams are activated, e.g. for support of handover or beam refinement. Alternatively, the network may use conventional measurement reports from wireless devices to detect instances of beam overlap. Furthermore, the network may use the reported information to adapt/modify various beams ', e.g., SSB beams', beamforming configuration parameters and/or transmit power and/or modify the number of beams, e.g., used in a beam sweep, to change the beams' compound coverage area pattern in order to more optimally cover an intended coverage area, e.g., a cell.

From the wireless device's point of view, some of the embodiments herein may comprise receiving configuration information instructing the wireless device to detect and report cases of overlapping logically non-adjacent beams or overlapping beams in general, detect cases of overlapping logically non-adjacent beams or overlapping beams in general based on measurements on downlink signals, such as reference signals, recording information related to the detected cases of overlapping logically non-adjacent beams or overlapping beams in general and reporting all or parts of the recorded information to the network. In the alternative case where the network may rely on conventional reports and configuration framework, some of the embodiments herein may be transparent to the wireless device.

Certain embodiments may provide one or more of the following technical advantage(s). Embodiments herein may enable the network to learn the actual situation of beam overlaps, as they may be perceived by receiving wireless devices, that is, the actual beam coverage situation. Based on this, the network may make more appropriate and well-founded choices of beams to activate in cases where only a subset of the available beams may need to be activated.

For example, using the beam overlap information, the network node 102, e.g., a gNB, may select an efficient set of beams which together cover the desired continuous coverage area. This may allow a minimum amount of RS transmissions and measurements for handover or for support of beam refinement.

In particular, it may be noted that, using embodiments herein, the first node 101, e.g., an gNB, may detect not only substantial physical overlap of two "logically adjacent" beams, but also cases where "logically non-adjacent" beams, fully or partly, may overlap with each other. Here, two "logically adjacent" beams may be understood as two beams which may be transmitted with beamforming configurations which may give them partially overlapping or contiguous coverage areas in a free space transmission environment.

Potentially, embodiments herein may also facilitate modification and adaptation of the beamforming configurations used for SSB beams and/or CSI-RS beams, or other beamformed reference signal transmissions, so that more optimal coverage patterns may be achieved.

Figure 4:
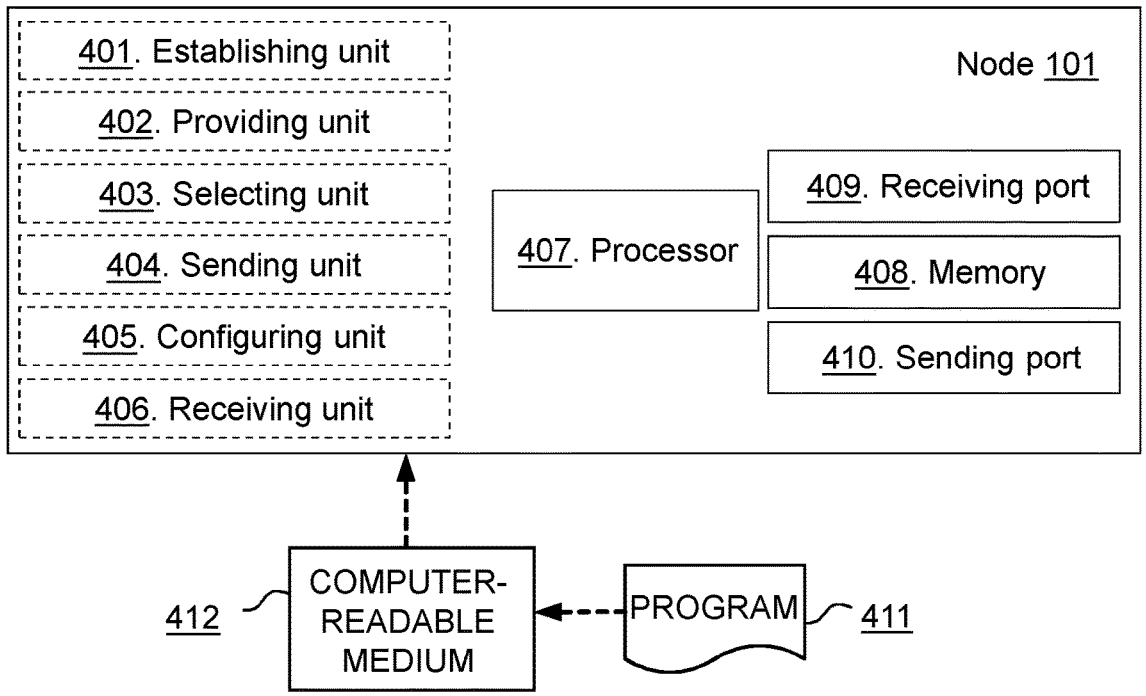
FIG. 4 is a schematic block diagram illustrating embodiments of a first node, according to embodiments herein.
Figure 4:
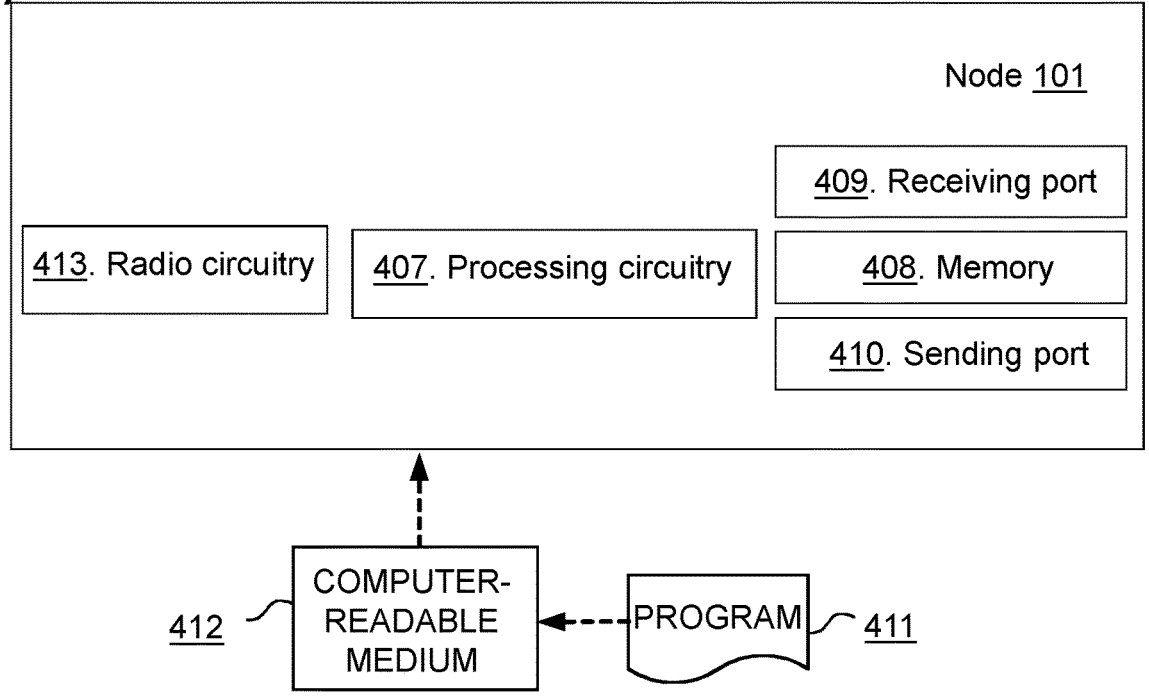

FIG. 4 depicts two different examples in panels a) and b), respectively, of the arrangement that the node 101 may comprise to perform the method actions described above in relation to FIG. 2. In some embodiments, the node 101 may comprise the following arrangement depicted in FIG. 4a. The node 101 may be understood to be for handling beamforming beams. The node 101 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the node 101, and will thus not be repeated here. For example, in some embodiments, the node 101 may be configured to be one of the one or more wireless devices 130. In other embodiments, the node 101 may be configured to be the network node 102.

In FIG. 4, optional modules are indicated with dashed boxes.

The node 101 is configured to, e.g. by means of an establishing unit 401 within the node 101 configured to, provide the second indication to at least one of: the node 101, the one or more second radio network nodes 120, and the one or more wireless devices 130, the second indication being configured to be based on the overlap configured to be established.

In some embodiments, the establishing may be configured to be based the on one or more criteria configured to be selected from at least one of: a) the first level of similarity in the first result of the one or more measurements configured to be obtained from the at least two beams within a first time period, and b) the second level of similarity in coverage areas of each of the at least two beams, the coverage areas may be configured to be derived according to the first result of the one or more measurements configured to be obtained from the at least two beams within the second time period, and the respective geographical position of the one or more first radio network nodes 110.

The overlapping beams may be configured to be logically non-adjacent beams.

In some embodiments wherein the node 101 may be configured to be the network node 102, the node 101 may be configured to, e.g. by means of a selecting unit 403 within the node 101 configured to, select the second set of beams 142 to be transmitted by the one or more second radio network nodes 120, based on the establishment that the at least two beams in the first set of beams 141 are overlapping.

In such embodiments, the one of the following options may be configured to apply: i) the one or more second radio network nodes 120 are the same as the one or more first radio network nodes 110, ii) the one or more of the one or more second radio network nodes 120 are the same as the one or more first radio network nodes 110; and iii) all of the one or more second radio network nodes 120 are different from the one or more first radio network nodes 110.

In some embodiments wherein the node 101 may be configured to be the network node 102, the node 101 may be configured to, e.g. by means of a sending unit 404 within the node 101 configured to, send the third indication to at least one of: the one or more second radio network nodes 120 and the one or more wireless devices 130. The third indication may be configured to indicate the second set of beams 142 configured to be selected.

In some embodiments wherein the node 101 may be configured to be the network node 102, the node 101 may be configured to, e.g. by means of a configuring unit 405 within the node 101 configured to, configure the one or more wireless devices 130 to send the information. The configuring may be further configured to comprise at least one of: i) the one or more first rules on how to perform the one or more measurements on the first set of beams 141, ii) the one or more second rules on how to determine that the at least two beams in the first set of beams 141 are overlapping, iii) the one or more third rules on which elements are to be comprised in the first indication, the report or both, and iv) the one or more fourth rules on when to send the information to the node 101.

In some embodiments, the configuration may be configured to be performed by sending at least one of the system information and the dedicated signalling.

In some embodiments wherein the node 101 may be configured to be the network node 102, the node 101 may be configured to, e.g. by means of a receiving unit 406 within the node 101 configured to, receive the information from the one or more wireless devices 130, the information being configured to indicate that the at least two beams in the first set of beams 141 are overlapping.

In some embodiments wherein the node 101 may be configured to be the network node 102, the node 101 may be configured to, e.g. by means of the selecting unit 403 within the node 101, further configured to, select the one or more wireless devices 130 that are to send the information. The information may be configured to be received from the selected one or more wireless devices 130.

The embodiments herein in the node 101 may be implemented through one or more processors, such as a processor 407 in the node 101 depicted in FIG. 4a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the node 101. One such carrier may be in the form of a CD ROM disc. It is however feasible with other data carriers such as a memory stick. The computer program code may furthermore be provided as pure program code on a server and downloaded to the node 101.

The node 101 may further comprise a memory 408 comprising one or more memory units. The memory 408 is arranged to be used to store obtained information, store data, configurations, schedulings, and applications etc. to perform the methods herein when being executed in the node 101.

In some embodiments, the node 101 may receive information from, e.g., the one or more first radio network nodes 110, the one or more second radio network nodes 120 and/or the one or more wireless devices 130, through a receiving port 409. In some embodiments, the receiving port 409 may be, for example, connected to one or more antennas in node 101. In other embodiments, the node 101 may receive information from another structure in the wireless communications network 100 through the receiving port 409. Since the receiving port 409 may be in communication with the processor 407, the receiving port 409 may then send the received information to the processor 407. The receiving port 409 may also be configured to receive other information.

The processor 407 in the node 101 may be further configured to transmit or send information to e.g., the one or more first radio network nodes 110, the one or more second radio network nodes 120 and/or the one or more wireless devices 130, or another structure in the wireless communications network 100, through a sending port 410, which may be in communication with the processor 407, and the memory 408.

Those skilled in the art will also appreciate any of the units 401-406 described above may refer to a combination of analog and digital modules, and/or one or more processors configured with software and/or firmware, e.g., stored in memory, that, when executed by the one or more processors such as the processor 407, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, any of the units 401-406 described above may be implemented as one or more applications running on one or more processors such as the processor 407.

Thus, the methods according to the embodiments described herein for the node 101 may be respectively implemented by means of a computer program 411 product, comprising instructions, i.e., software code portions, which, when executed on at least one processor 407, cause the at least one processor 407 to carry out the actions described herein, as performed by the node 101. The computer program 411 product may be stored on a computer-readable storage medium 412. The computer-readable storage medium 412, having stored thereon the computer program 411, may comprise instructions which, when executed on at least one processor 407, cause the at least one processor 407 to carry out the actions described herein, as performed by the node 101. In some embodiments, the computer-readable storage medium 412 may be a non-transitory computer-readable storage medium, such as a CD ROM disc, or a memory stick. In other embodiments, the computer program 411 product may be stored on a carrier containing the computer program 411 just described, wherein the carrier is one of an electronic signal, optical signal, radio signal, or the computer-readable storage medium 412, as described above.

The node 101 may comprise a communication interface configured to facilitate communications between the node 101 and other nodes or devices, e.g., the one or more first radio network nodes 110, the one or more second radio network nodes 120 and/or the one or more wireless devices 130. The interface may, for example, include a transceiver configured to transmit and receive radio signals over an air interface in accordance with a suitable standard.

In other embodiments, the node 101 may comprise the following arrangement depicted in FIG. 4b. The node 101 may comprise a processing circuitry 407, e.g., one or more processors such as the processor 407, in the node 101 and the memory 408. The node 101 may also comprise a radio circuitry 413, which may comprise e.g., the receiving port 409 and the sending port 410. The processing circuitry 413 may be configured to, or operable to, perform the method actions according to FIG. 2, in a similar manner as that described in relation to FIG. 4a. The radio circuitry 413 may be configured to set up and maintain at least a wireless connection with the one or more first radio network nodes 110, the one or more second radio network nodes 120 and/or the one or more wireless devices 130. Circuitry may be understood herein as a hardware component.

Figure 2:
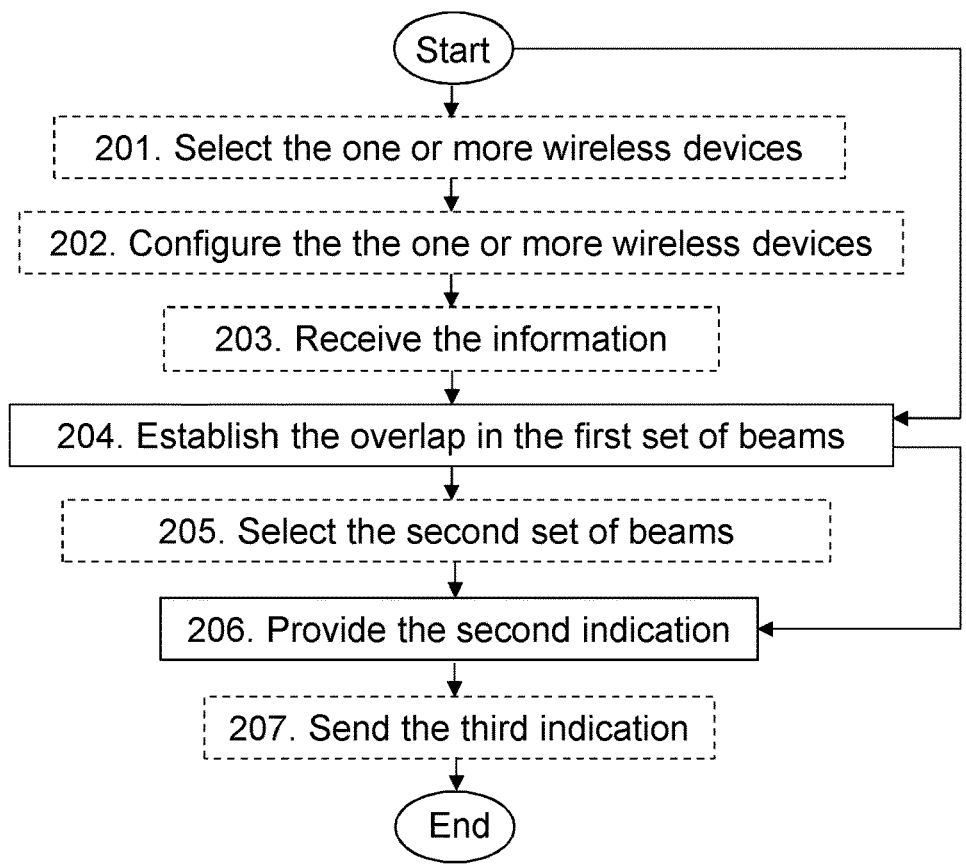
FIG. 2 is a flowchart depicting a method in a first node, according to embodiments herein.

Hence, embodiments herein also relate to the node 101 comprising the processing circuitry 407 and the memory 408, said memory 408 containing instructions executable by said processing circuitry 407, whereby the node 101 is operative to perform the actions described herein in relation to the node 101, e.g., in FIG. 2.

Figure 5:
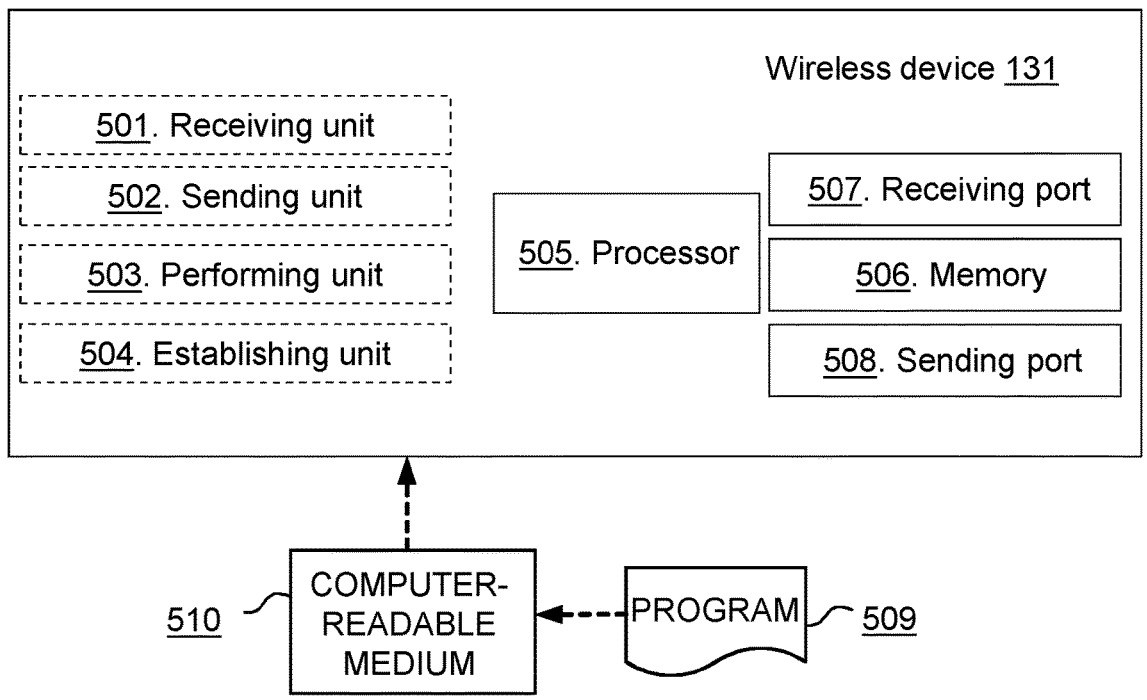
FIG. 5 is a schematic block diagram illustrating a wireless device, according to embodiments herein.
Figure 5:
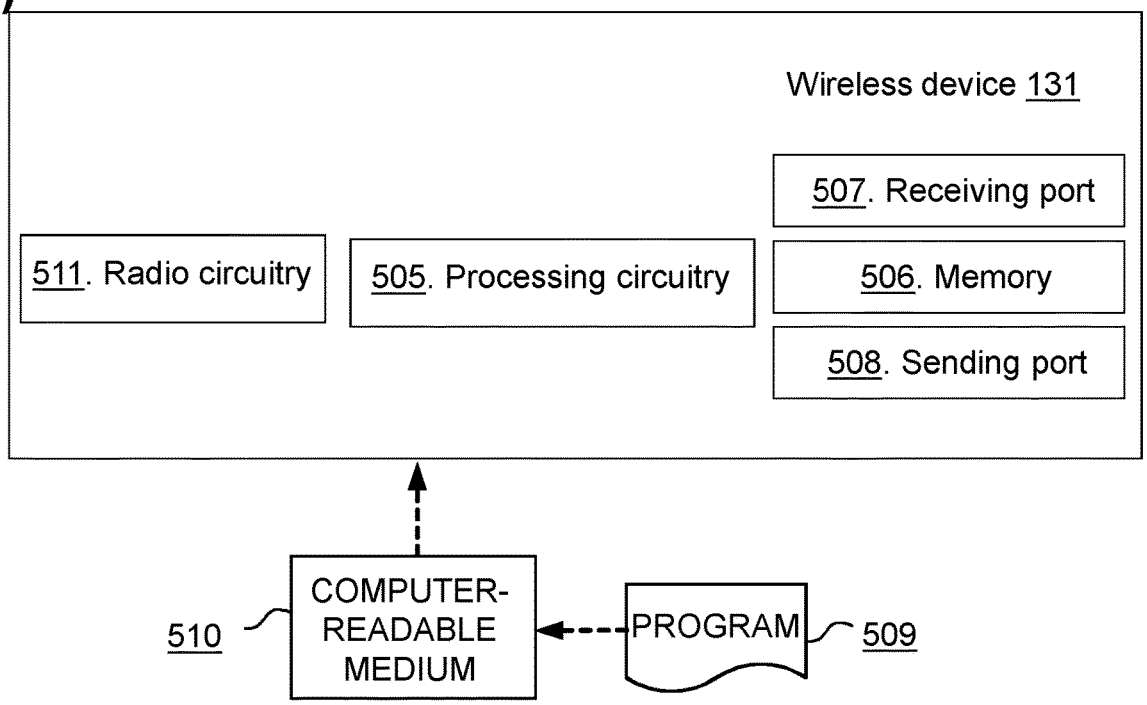

FIG. 5 depicts two different examples in panels a) and b), respectively, of the arrangement that the wireless device 131 may comprise to perform the method actions described above in relation to FIG. 3. In some embodiments, the wireless device 131 may comprise the following arrangement depicted in FIG. 5a. The wireless device 131 may be understood to be for handling beamforming beams. The wireless device 131 may be further configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the one or more first radio network nodes 110, and will thus not be repeated here. For example, the overlapping beams may be configured to be logically non-adjacent beams.

In FIG. 5, optional modules are indicated with dashed boxes.

The wireless device 131 is configured to, e.g. by means of a receiving unit 501 within the wireless device 131 configured to, receive, from the network node 102 configured to operate in the wireless communications network 100 or from the memory within the wireless device 131, the configuration to send information to the network node 102. The configuration is configured to comprise at least one of: i) the one or more second rules on how to determine that at least two beams in the first set of beams 141 configured to be to be transmitted by one or more radio network nodes 110 configured to operate in the wireless communications network 100 are overlapping, ii) the one or more third rules on what elements information to be sent to the network node 102 is to comprise, wherein the information is to comprise a report comprising the second result of the determination, by the wireless device 131, on whether or not the at least two beams in the first set of beams 141 are overlapping, and iii) the one or more fourth rules on when to send the information to the network node 102.

In some embodiments, the information may be configured to comprise at least one of: i) the first indication of the first result of one or more measurements configured to be performed by the wireless device 131 on the first set of beams 141, and ii) the report configured to comprise the second result of the determination, by the wireless device 131, that the at least two beams in the first set of beams 141 may be overlapping.

In some embodiments, the configuration may be configured to be received by receiving, from the network node 102, at least one of: the system information and the dedicated signalling.

The wireless device 131 is also configured to, e.g. by means of a sending unit 502 within the wireless device 131 configured to, send the information to the network node 102, based on the configuration configured to be received.

In some embodiments, the wireless device 131 may be further configured to, e.g. by means of a performing unit 503 within the wireless device 131 configured to, perform the one or more measurements on the first set of beams 141 based on the configuration configured to be received.

In some embodiments, the wireless device 131 may be further configured to, e.g., by means of an establishing unit 504 within the wireless device 131 configured to, establish that the at least two beams in the first set of beams 141 are overlapping. The establishing may be configured to be based on the configuration configured to be received and the one or more measurements configured to be performed.

In some embodiments, the wireless device 131 may be further configured to, e.g., by means of the receiving unit 501 within the wireless device 131 further configured to, receive, based on the information configured to be sent, the third indication from the network node 102. The third indication may be configured to indicate the second set of beams 142 to be transmitted by one or more second radio network nodes 120.

The embodiments herein in the wireless device 131 may be implemented through one or more processors, such as a processor 505 in the wireless device 131 depicted in FIG. 5a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 131. One such carrier may be in the form of a CD ROM disc. It is however feasible with other data carriers such as a memory stick. The computer program code may furthermore be provided as pure program code on a server and downloaded to the wireless device 131.

The wireless device 131 may further comprise a memory 506 comprising one or more memory units. The memory 506 is arranged to be used to store obtained information, store data, configurations, schedulings, and applications etc. to perform the methods herein when being executed in the wireless device 131.

In some embodiments, the wireless device 131 may receive information from, e.g., the one or more first radio network nodes 110, the one or more second radio network nodes 120 and/or any of the other one or more wireless devices 130, through a receiving port 507. In some embodiments, the receiving port 507 may be, for example, connected to one or more antennas in wireless device 131. In other embodiments, the wireless device 131 may receive information from another structure in the wireless communications network 100 through the receiving port 507. Since the receiving port 507 may be in communication with the processor 505, the receiving port 507 may then send the received information to the processor 505. The receiving port 507 may also be configured to receive other information.

The processor 505 in the wireless device 131 may be further configured to transmit or send information to e.g., the one or more first radio network nodes 110, the one or more second radio network nodes 120 and/or any of the other one or more wireless devices 130, or another structure in the wireless communications network 100, through a sending port 508, which may be in communication with the processor 505, and the memory 506.

Those skilled in the art will also appreciate that any of the units 501-504 described above may refer to a combination of analog and digital modules, and/or one or more processors configured with software and/or firmware, e.g., stored in memory, that, when executed by the one or more processors such as the processor 505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, any of the units 501-504 described above may be implemented as one or more applications running on one or more processors such as the processor 505.

Thus, the methods according to the embodiments described herein for the wireless device 131 may be respectively implemented by means of a computer program 509 product, comprising instructions, i.e., software code portions, which, when executed on at least one processor 505, cause the at least one processor 505 to carry out the actions described herein, as performed by the wireless device 131. The computer program 509 product may be stored on a computer-readable storage medium 510. The computer-readable storage medium 510, having stored thereon the computer program 509, may comprise instructions which, when executed on at least one processor 505, cause the at least one processor 505 to carry out the actions described herein, as performed by the wireless device 131. In some embodiments, the computer-readable storage medium 510 may be a non-transitory computer-readable storage medium, such as a CD ROM disc, or a memory stick. In other embodiments, the computer program 509 product may be stored on a carrier containing the computer program 509 just described, wherein the carrier is one of an electronic signal, optical signal, radio signal, or the computer-readable storage medium 510, as described above.

The wireless device 131 may comprise a communication interface configured to facilitate communications between the wireless device 131 and other nodes or devices, e.g., the wireless device 131 and/or the one or more wireless devices 130. The interface may, for example, include a transceiver configured to transmit and receive radio signals over an air interface in accordance with a suitable standard.

In other embodiments, the wireless device 131 may comprise the following arrangement depicted in FIG. 5*b*. The wireless device 131 may comprise a processing circuitry 505, e.g., one or more processors such as the processor 505, in the wireless device 131 and the memory 506. The wireless device 131 may also comprise a radio circuitry 511, which may comprise e.g., the receiving port 507 and the sending port 508. The processing circuitry 511 may be configured to, or operable to, perform the method actions according to FIG. 3, in a similar manner as that described in relation to FIG. 5*a*. The radio circuitry 511 may be configured to set up and maintain at least a wireless connection with the one or more first radio network nodes 110, the one or more second radio network nodes 120 and/or any of the other one or more wireless devices 130. Circuitry may be understood herein as a hardware component.

Figure 3:
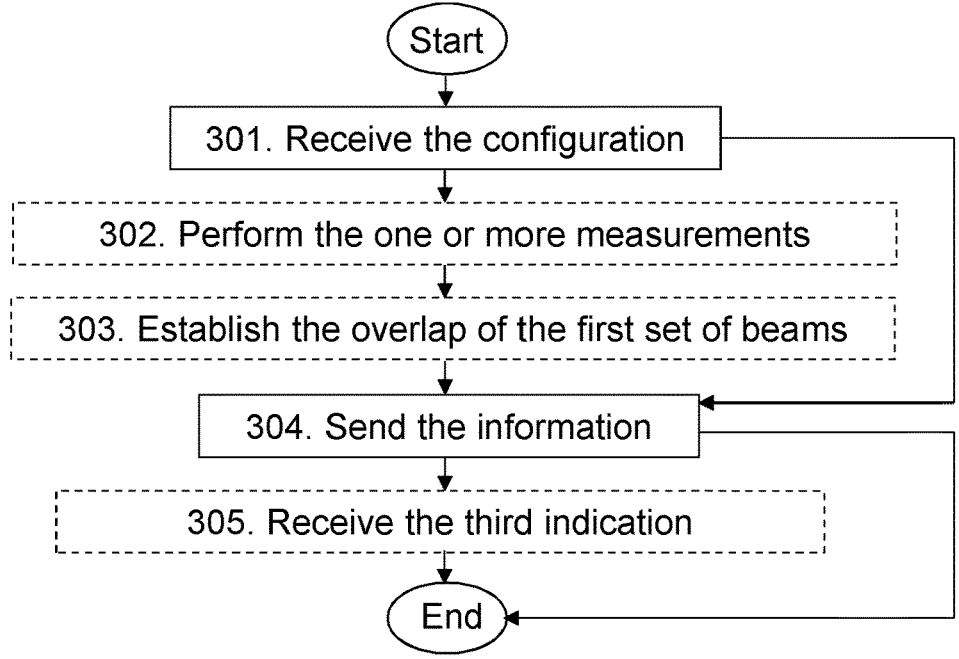
FIG. 3 is a flowchart depicting a method in a wireless device, according to embodiments herein.

Hence, embodiments herein also relate to the wireless device 131 comprising the processing circuitry 505 and the memory 506, said memory 506 containing instructions executable by said processing circuitry 505, whereby the wireless device 131 is operative to perform the actions described herein in relation to the wireless device 131, e.g., in FIG. 3.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Some Numbered Example Embodiments

1. A node (101) for handling beamforming beams, the node (101) being configured to operate in a wireless communications network (100), the node (101) comprising:
   an establishing module (401) configured to establish that at least two beams in a first set of beams (141) configured to be transmitted by one or more first radio network nodes (110) configured to operate in the wireless communications network (100) are overlapping, the establishing being configured to be based on information configured to comprise at least one of:
      i. a first indication of a first result of one or more measurements configured to be performed by one or more wireless devices (130) on the first set of beams (141), and
      ii. a report configured to comprise a second result of a determination that the at least two beams in the first set of beams (141) are overlapping, and
   a providing module (402) configured to provide a second indication to at least one of: the node (101), the one or more second radio network nodes (120), and the one or more wireless devices (130), the second indication being configured to be based on the overlap configured to be established.

2. The node (101) according to numbered example 1, wherein the establishing is configured to be based on one or more criteria configured to be selected from at least one of:
   a. a first level of similarity in the first result of the one or more measurements configured to be obtained from the at least two beams within a first time period, and
   b. a second level of similarity in coverage areas of each of the at least two beams, the coverage areas being configured to be derived according to the first result of the one or more measurements configured to be obtained from the at least two beams within a second time period, and a respective geographical position of the one or more first radio network nodes (110).
3. The node (101) according to any of numbered examples 1-2, wherein the overlapping beams are configured to be logically non-adjacent beams.
4. The node (101) according to any of numbered examples 1-3, wherein the node (101) is configured to be one of the one or more wireless devices (130).
5. The node (101) according to any of numbered examples 1-3, wherein the node (101) is configured to be a network node (102).
6. The node (101) according to numbered example 5, further comprising:
   a selecting module (403) configured to select a second set of beams (142) to be transmitted by one or more second radio network nodes (120), based on the establishment that the at least two beams in the first set of beams (141) are overlapping, wherein one of the following options are configured to apply:
      i. the one or more second radio network nodes (120) are the same as the one or more first radio network nodes (110);
      ii. one or more of the one or more second radio network nodes (120) are the same as the one or more first radio network nodes (110);
      iii. all of the one or more second radio network nodes (120) are different from the one or more first radio network nodes (110).
7. The node (101) according to numbered example 6, further comprising:
   a sending module (404) configured to send a third indication to at least one of: the one or more second radio network nodes (120) and the one or more wireless devices (130), the third indication being configured to indicate the second set of beams (142) configured to be selected.
8. The node (101) according to any of numbered examples 5-7, further comprising:
   a configuring module (405) configured to configure the one or more wireless devices (130) to send the information, the configuring being further configured to comprise at least one of:
      i. one or more first rules on how to perform the one or more measurements on the first set of beams (141),
      ii. one or more second rules on how to determine that the at least two beams in the first set of beams (141) are overlapping,
      iii. one or more third rules on which elements are to be comprised in the first indication, the report or both, and
      iv. one or more fourth rules on when to send the information to the node (101).
9. The node (101) according to numbered example 8, wherein the configuration is configured to be performed by sending at least one of system information and dedicated signalling.
10. The node (101) according to any of numbered examples 5-9, further comprising:
    a receiving module (406) configured to receive the information from the one or more wireless devices (130), the information being configured to indicate that the at least two beams in a first set of beams (141) are overlapping.
11. The node (101) according to any of numbered examples 5-10, wherein the selecting module (403) is further configured to:
    select the one or more wireless devices (130) that are to send the information, and wherein the information is configured to be received from the selected one or more wireless devices (130).
12. A wireless device (131) for handling beamforming beams, the wireless device (131) being configured to operate in a wireless communications network (100), the wireless device (131) comprising:
    a receiving module (501) configured to receive, from a network node (102) configured to operate in the wireless communications network (100) or from a memory within the wireless device (131), a configuration to send information to the network node (102), the configuration being configured to comprise at least one of:
       i. one or more second rules on how to determine that at least two beams in a first set of beams (141) configured to be to be transmitted by one or more radio network nodes (110) configured to operate in the wireless communications network (100) are overlapping,
       ii. one or more third rules on what elements information to be sent to the network node (102) is to comprise, wherein the information is to comprise a report comprising a second result of a determination, by the wireless device (131), on whether or not the at least two beams in the first set of beams (141) are overlapping, and
       iii. one or more fourth rules on when to send the information to the network node (102), and
    a sending module (502) configured to send the information to the network node (102), based on the configuration configured to be received.
13. The wireless device (131) according to numbered example 12, wherein the information is configured to comprise at least one of:
    i. a first indication of a first result of one or more measurements configured to be performed by the wireless device (131) on the first set of beams (141), and
    ii. the report configured to comprise the second result of the determination, by the wireless device (131), that the at least two beams in the first set of beams (141) are overlapping.
14. The wireless device (131) according to numbered example 13, wherein the wireless device (131) further comprises:
    a performing module (503) configured to perform the one or more measurements on the first set of beams (141) based on the configuration configured to be received.

15. The wireless device (131) according to numbered example 14, wherein the wireless device (131) further comprises:
   an establishing module (504) configured to establish that the at least two beams in the first set of beams (141) are overlapping, the establishing being configured to be based on the configuration configured to be received and the one or more measurements configured to be performed.
16. The wireless device (131) according to any of numbered examples 12-15, wherein the receiving module (501) is further configured to:
   receive, based on the information configured to be sent, a third indication from the network node (102), the third indication being configured to indicate a second set of beams (142) to be transmitted by one or more second radio network nodes (120).
17. The wireless device (131) according to any of numbered examples 12-16, wherein the configuration is configured to be received by receiving, from the network node (102), at least one of: system information and dedicated signalling.
18. The wireless device (131) according to any of numbered examples 12-18, wherein the overlapping beams are configured to be logically non-adjacent beams.
19. A node (101) operative to handle beamforming beams, the node (101) being further operative to operate in a wireless communications network (100), the node (101) comprising a processing circuitry (505) and a memory (506), said memory (506) containing instructions executable by said processing circuitry (505), whereby said node (101) is further operative to:
   establish that at least two beams in a first set of beams (141) operative to be transmitted by one or more first radio network nodes (110) operative to operate in the wireless communications network (100) are overlapping, the establishing being based on information operative to comprise at least one of:
      i. a first indication of a first result of one or more measurements operative to be performed by one or more wireless devices (130) on the first set of beams (141), and
      ii. a report operative to comprise a second result of a determination that the at least two beams in the first set of beams (141) are overlapping, and
   provide a second indication to at least one of: the node (101), the one or more second radio network nodes (120), and the one or more wireless devices (130), the second indication being based on the overlap operative to be established.
20. The node (101) according to numbered example 19, wherein the establishing is based on one or more criteria operative to be selected from at least one of:
   a. a first level of similarity in the first result of the one or more measurements operative to be obtained from the at least two beams within a first time period, and
   b. a second level of similarity in coverage areas of each of the at least two beams, the coverage areas being operative to be derived according to the first result of the one or more measurements operative to be obtained from the at least two beams within a second time period, and a respective geographical position of the one or more first radio network nodes (110).
21. The node (101) according to any of numbered examples 19-20, wherein the overlapping beams are operative to be logically non-adjacent beams.
22. The node (101) according to any of numbered examples 19-21, wherein the node (101) is operative to be one of the one or more wireless devices (130).
23. The node (101) according to any of numbered examples 19-21, wherein the node (101) is operative to be a network node (102).
24. The node (101) according to numbered example 23, being further operative to:
   select a second set of beams (142) to be transmitted by one or more second radio network nodes (120), based on the establishment that the at least two beams in the first set of beams (141) are overlapping, wherein one of the following options are operative to apply:
      i. the one or more second radio network nodes (120) are the same as the one or more first radio network nodes (110);
      ii. one or more of the one or more second radio network nodes (120) are the same as the one or more first radio network nodes (110);
      iii. all of the one or more second radio network nodes (120) are different from the one or more first radio network nodes (110).
25. The node (101) according to numbered example 24, being further operative to:
   send a third indication to at least one of the one or more second radio network nodes (120) and the one or more wireless devices (130), the third indication being operative to indicate the second set of beams (142) operative to be selected.
26. The node (101) according to any of numbered examples 23-25, being further operative to:
   configure the one or more wireless devices (130) to send the information, the configuring being further operative to comprise at least one of:
      i. one or more first rules on how to perform the one or more measurements on the first set of beams (141),
      ii. one or more second rules on how to determine that the at least two beams in the first set of beams (141) are overlapping,
      iii. one or more third rules on which elements are to be comprised in the first indication, the report or both, and
      iv. one or more fourth rules on when to send the information to the node (101).
27. The node (101) according to numbered example 26, wherein the configuration is operative to be performed by sending at least one of: system information and dedicated signalling.
28. The node (101) according to any of numbered examples 23-27, being further operative to:
   receive the information from the one or more wireless devices (130), the information being operative to indicate that the at least two beams in a first set of beams (141) are overlapping.
29. The node (101) according to any of numbered examples 23-29, being further operative to:
   select the one or more wireless devices (130) that are to send the information, and wherein the information is operative to be received from the selected one or more wireless devices (130).
30. A wireless device (131) operative to handle beamforming beams, the wireless device (131) being operative to operate in a wireless communications network (100), the wireless device (131) being further operative to:

receive, from a network node (102) operative to operate in the wireless communications network (100) or from a memory within the wireless device (131), a configuration to send information to the network node (102), the configuration being operative to comprise at least one of:
  i. one or more second rules on how to determine that at least two beams in a first set of beams (141) operative to be to be transmitted by one or more radio network nodes (110) operative to operate in the wireless communications network (100) are overlapping,
  ii. one or more third rules on what elements information to be sent to the network node (102) is to comprise, wherein the information is to comprise a report comprising a second result of a determination, by the wireless device (131), on whether or not the at least two beams in the first set of beams (141) are overlapping, and
  iii. one or more fourth rules on when to send the information to the network node (102), and
send the information to the network node (102), based on the configuration operative to be received.
31. The wireless device (131) according to numbered example 30, wherein the information is operative to comprise at least one of:
  i. a first indication of a first result of one or more measurements operative to be performed by the wireless device (131) on the first set of beams (141), and
  ii. the report operative to comprise the second result of the determination, by the wireless device (131), that the at least two beams in the first set of beams (141) are overlapping.
32. The wireless device (131) according to numbered example 31, wherein the wireless device (131) is further operative to:
  perform the one or more measurements on the first set of beams (141) based on the configuration operative to be received.
33. The wireless device (131) according to numbered example 32, wherein the wireless device (131) is further operative to:
  establish that the at least two beams in the first set of beams (141) are overlapping, the establishing being based on the configuration operative to be received and the one or more measurements operative to be performed.
34. The wireless device (131) according to any of numbered examples 30-33, wherein the wireless device (131) is further operative to:
  receive, based on the information operative to be sent, a third indication from the network node (102), the third indication being operative to indicate a second set of beams (142) to be transmitted by one or more second radio network nodes (120).
35. The wireless device (131) according to any of numbered examples 30-34, wherein the configuration is operative to be received by receiving, from the network node (102), at least one of: system information and dedicated signalling.
36. The wireless device (131) according to any of numbered examples 30-35, wherein the overlapping beams are operative to be logically non-adjacent beams.

Further Extensions and Variations

Figure 6:
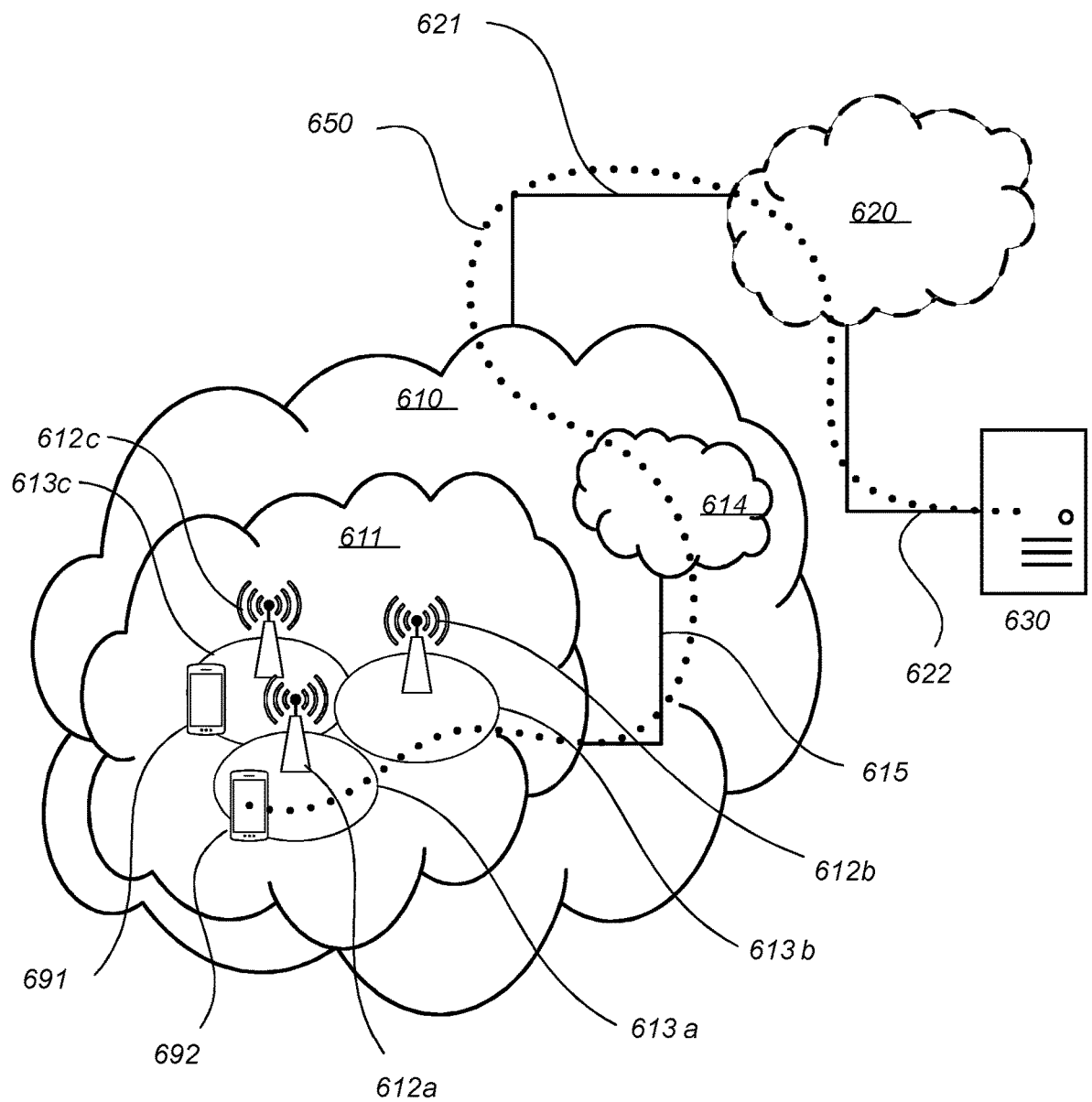
FIG. 6 is a schematic block diagram illustrating a telecommunication network connected via an intermediate network to a host computer, according to embodiments herein.

FIG. 6: Telecommunication Network Connected Via an Intermediate Network to a Host Computer in Accordance with Some Embodiments With reference to FIG. 6, in accordance with an embodiment, a communication system includes telecommunication network 610 such as the wireless communications network 100, for example, a 3GPP-type cellular network, which comprises access network 611, such as a radio access network, and core network 614. Access network 611 comprises a plurality of network nodes such as the network node 102. For example, base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A plurality of wireless devices, such as any of the one or more wireless devices 130, e.g., the wireless device 131, are comprised in the wireless communications network 100. In FIG. 6, a first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612. Any of the UEs 691, 692 are examples of any of the one or more wireless devices 130, e.g., the wireless device 131.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

In relation to FIGS. 7, 8, 9, 10, and 11, which are described next, it may be understood that a UE is an example of any of the one or more wireless devices 130, e.g., the wireless device 131, and that any description provided for the UE equally applies to any of the one or more wireless devices 130, e.g., the wireless device 131. It may be also understood that the base station is an example of the network node 102, and that any description provided for the base station equally applies to the network node 102.

Figure 7:
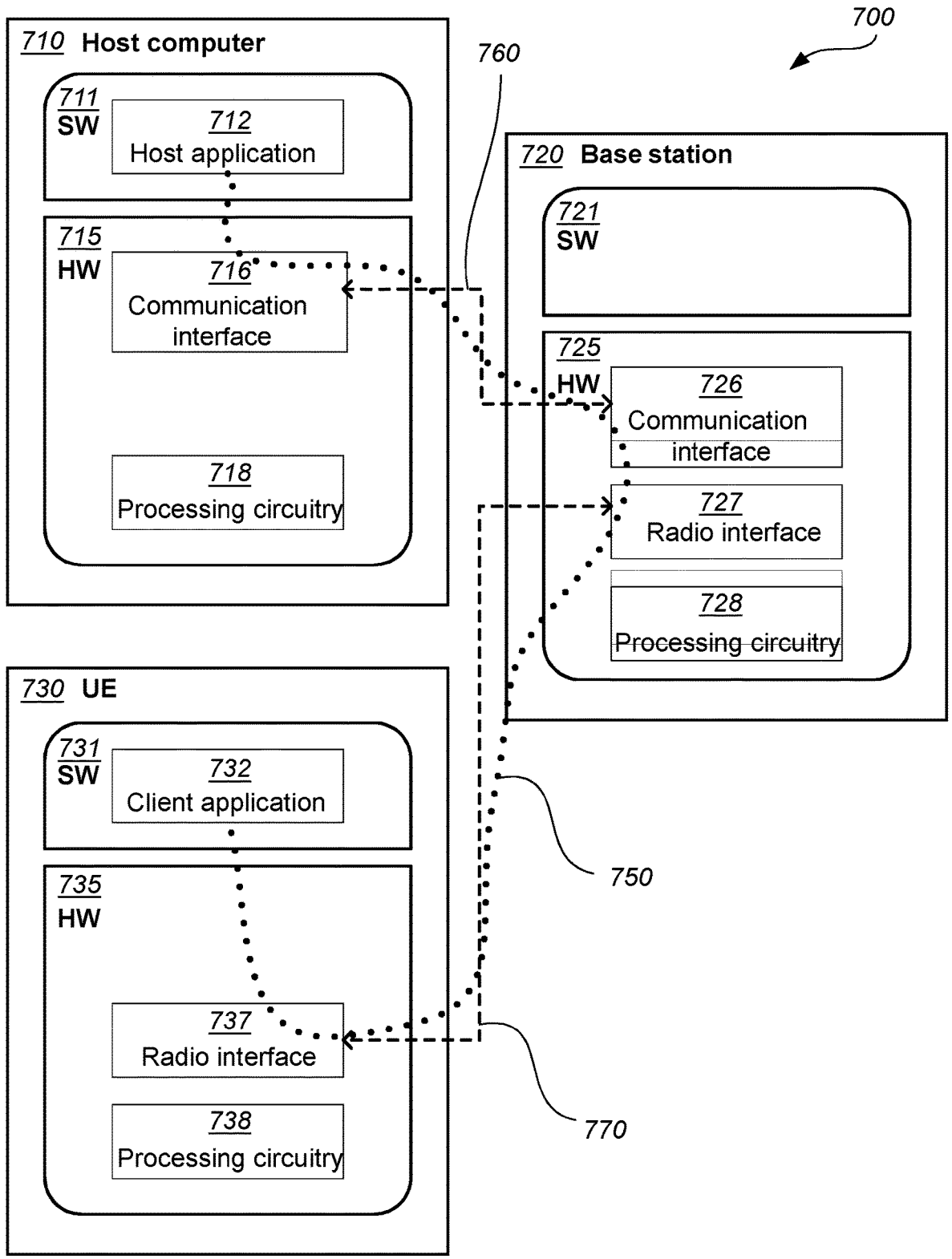
FIG. 7 is a generalized block diagram of a host computer communicating via a base station with a user equipment over a partially wireless connection, according to embodiments herein.

FIG. 7: Host Computer Communicating Via a Base Station with a User Equipment Over a Partially Wireless Connection in Accordance with Some Embodiments Example implementations, in accordance with an embodiment, of any of the one or more wireless devices 130, e.g., the wireless device 131, e.g., a UE, the network node 102, e.g., a base station and host computer discussed in the preceding paragraphs will now be described with reference to FIG. 7. In communication system 700, such as the wireless communications network 100, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes the network node 102, exemplified in FIG. 7 as a base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with any of the one or more wireless devices 130, e.g., the wireless device 131, exemplified in FIG. 7 as a UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

FIG. 8: Methods Implemented in a Communication System Including a Host Computer, a Base Station and a User Equipment in Accordance with Some Embodiments FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 9: Methods Implemented in a Communication System Including a Host Computer, a Base Station and a User Equipment in Accordance with Some Embodiments FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

FIG. 10: Methods Implemented in a Communication System Including a Host Computer, a Base Station and a User Equipment in Accordance with Some Embodiments FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 11: Methods Implemented in a Communication System Including a Host Computer, a Base Station and a User Equipment in Accordance with Some Embodiments FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the node 101 as the network node 102.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the node 101 as the network node 102.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the node 101 as the network node 102.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the node 101 as the network node 102.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by any of the one or more wireless devices 130, e.g., the wireless device 131.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by any of the one or more wireless devices 130, e.g., the wireless device 131.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by any of the one or more wireless devices 130, e.g., the wireless device 131.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by any of the one or more wireless devices 130, e.g., the wireless device 131.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by any of the one or more wireless devices 130, e.g., the wireless device 131.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by any of the one or more wireless devices 130, e.g., the wireless device 131.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a user equipment (UE), comprising one or more of the actions described herein as performed by any of the one or more wireless devices 130, e.g., the wireless device 131.

52. The method of embodiment 51, further comprising:
  providing user data; and
  forwarding the user data to a host computer via the transmission to the base station.
55. A method implemented in a communication system including a host computer, a base station and a user equipment (UE), the method comprising:
  at the host computer, receiving user data transmitted to the base station from the UE, wherein the UE performs one or more of the actions described herein as performed by any of the one or more wireless devices 130, e.g., the wireless device 131.
56. The method of embodiment 55, further comprising:
  at the UE, providing the user data to the base station.
57. The method of embodiment 56, further comprising:
  at the UE, executing a client application, thereby providing the user data to be transmitted; and
  at the host computer, executing a host application associated with the client application.
58. The method of embodiment 56, further comprising:
  at the UE, executing a client application; and
  at the UE, receiving input data to the client application, the input data being provided at the host computer by executing a host application associated with the client application,
  wherein the user data to be transmitted is provided by the client application in response to the input data.
61. A base station configured to communicate with a user equipment (UE), the base station comprising a radio interface and processing circuitry configured to perform one or more of the actions described herein as performed by the node 101 as the network node 102.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the node 101 as the network node 102.
66. The communication system of embodiment 65, further including the base station.
67. The communication system of embodiment 66, further including the UE, wherein the UE is configured to communicate with the base station.
68. The communication system of embodiment 67, wherein:
  the processing circuitry of the host computer is configured to execute a host application;
  the UE is configured to execute a client application associated with the host application, thereby providing the user data to be received by the host computer.
71. A method implemented in a base station, comprising one or more of the actions described herein as performed by the node 101 as the network node 102.
75. A method implemented in a communication system including a host computer, a base station and a user equipment (UE), the method comprising:
  at the host computer, receiving, from the base station, user data originating from a transmission which the base station has received from the UE, wherein the UE performs one or more of the actions described herein as performed by any of the one or more wireless devices 130, e.g., the wireless device 131.
76. The method of embodiment 75, further comprising:
  at the base station, receiving the user data from the UE.
77. The method of embodiment 76, further comprising:
  at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 3GPP | 3rd Generation Partnership Project |
| 5G | 5th Generation |
| AN | Access Node |
| CSI | Channel State Information |
| DMRS | Demodulation Reference Signal |
| DRX | Discontinuous Reception |
| eNB | Evolved NodeB |
| FFS | For Further Study |
| gNB | Base station in NR (corresponding to eNB in LTE). |
| GNSS | Global Navigation Satellite System |
| IE | Information Element |
| LTE | Long Term Evolution |
| MIB | Master Information Block |
| NGC | Next Generation Core |
| NR | New Radio |
| NW | Network |
| OFDM | Orthogonal Frequency Division Multiplex |
| PBCH | Physical Broadcast Channel |
| PRACH | Physical Random Access Channel |
| PSS | Primary Synchronization Signal |
| RACH | Random Access Channel |
| RAN | Radio Access Network |
| RAT | Radio Access Technology |
| RRC | Radio Resource Control |
| RRM | Radio Resource Management |
| RS | Reference Signal |
| RSRP | Reference Signal Received Power |
| RSRQ | Reference Signal Received Quality |
| SI | System Information |
| SINR | Signal to Interference plus Noise Ratio |
| SMTC | SS Block Measurement Timing Configuration (or SS/PBCH Block Measurement Timing Configuration) |
| SNR | Signal to Noise Ratio |
| SS | Synchronization Signal |
| SSB | Synchronization Signal Block |
| SSS | Secondary Synchronization Signal |
| SUPI | Subscription Permanent Identity |
| TRP | Transmission/Reception Point |
| TSS | Tertiary Synchronization Signal |
| UE | User Equipment |
| USIM | Universal Subscriber Identity Module |

The invention claimed is:
1. A method for handling beamforming beams, the method being performed by a node operating in a wireless communications network, and the method comprising:
  establishing that at least two beams in a first set of beams transmitted by one or more first radio network nodes operating in the wireless communications network are overlapping, the establishing being based on at least information including a first indication of a first result of one or more measurements performed by one or more wireless devices on the first set of beams, the node being one of the one or more wireless devices, and the establishing being further based on a first level of similarity in coverage areas of each of the at least two beams, the coverage areas being derived according to the first result of the one or more measurements obtained from the at least two beams within a first time period, and a respective geographical position of the one or more first radio network nodes; and providing a second indication to at least one of: the node, one or more second radio network nodes, or the one or more wireless devices, the second indication being based on the established overlap of the at least two beams in the first set of beams.

2. The method according to claim 1, wherein the establishing is further based on at least one of:
i. a report including a second result of a determination that the at least two beams in the first set of beams are overlapping; or
a second level of similarity in the first result of the one or more measurements obtained from the at least two beams within a second time period.

3. The method according to claim 1, wherein the overlapping beams are logically non-adjacent beams.

4. A method for handling beamforming beams, the method being performed by a wireless device operating in a wireless communications network, and the method comprising:

receiving, from a network node operating in the wireless communications network or from a memory within the wireless device, a configuration to send information to the network node, the configuration including at least one of:
i. one or more first rules on how to determine that at least two beams in a first set of beams to be transmitted by one or more radio network nodes operating in the wireless communications network are overlapping;
ii. one or more second rules on what elements to include in the information to be sent to the network node, the information including a report including a first result of a determination, by the wireless device, on whether or not the at least two beams in the first set of beams are overlapping; or
iii. one or more third rules on when to send the information to the network node;

performing one or more measurements on the first set of beams based on the received configuration;

determining that the at least two beams in the first set of beams are overlapping, the determining being based on the received configuration and the performed one or more measurements, and the determining being further based on a first level of similarity in coverage areas of each of the at least two beams, the coverage areas being derived according to a second result of the one or more measurements obtained from the at least two beams within a first time period, and a respective geographical position of the one or more radio network nodes; and sending the information to the network node, based on the received configuration.

5. The method according to claim 4, wherein the information includes at least one of:
i. a first indication of the second result of the one or more measurements performed by the wireless device on the first set of beams; and
ii. the report including the first result of the determination, by the wireless device, that the at least two beams in the first set of beams are overlapping.

6. The method according to claim 4, wherein the method further comprises:
receiving, based on the sent information, an indication from the network node, the indication indicating a second set of beams to be transmitted by at least one radio network node different from the one or more radio network nodes.

7. A node for handling beamforming beams, the node being configured to operate in a wireless communications network, and the node being further configured to:
establish that at least two beams in a first set of beams configured to be transmitted by one or more first radio network nodes configured to operate in the wireless communications network are overlapping, the establishing being configured to be based on at least information configured to include a first indication of a first result of one or more measurements configured to be performed by one or more wireless devices on the first set of beams, the node being one of the one or more wireless devices, the establishing being further configured to be based on a first level of similarity in coverage areas of each of the at least two beams, the coverage areas being derived according to the first result of the one or more measurements obtained from the at least two beams within a first time period, and a respective geographical position of the one or more first radio network nodes; and provide a second indication to at least one of: the node, one or more second radio network nodes, or the one or more wireless devices, the second indication being configured to be based on the overlap of the at least two beams in the first set of beams.

8. The node according to claim 7, wherein the establishing is further configured to be based on at least one of:
i. a report including a second result of a determination that the at least two beams in the first set of beams are overlapping; or
ii. a second level of similarity in the first result of the one or more measurements obtained from the at least two beams within a second time period.

9. A wireless device for handling beamforming beams, the wireless device being configured to operate in a wireless communications network, and the wireless device being further configured to:
receive, from a network node configured to operate in the wireless communications network or from a memory within the wireless device, a configuration to send information to the network node, the configuration being configured to include at least one of:
i. one or more first rules on how to determine that at least two beams in a first set of beams to be transmitted by one or more radio network nodes operating in the wireless communications network are overlapping;
ii. one or more second rules on what elements to include in the information to be sent to the network node, the information including a report including a first result of a determination, by the wireless device, on whether or not the at least two beams in the first set of beams are overlapping; or
iii. one or more third rules on when to send the information to the network node;

perform one or more measurements on the first set of beams based on the received configuration;

determine that the at least two beams in the first set of beams are overlapping, the determining being based on the received configuration and the performed one or more measurements, and the determining being further based on a first level of similarity in coverage areas of each of the at least two beams, the coverage areas being derived according to a second result of the one or more measurements obtained from the at least two beams within a first time period, and a respective geographical position of the one or more radio network nodes; and
send the information to the network node, based on the configuration configured to be received.

10. The wireless device according to claim 9, wherein the information is configured to include at least one of:
  i. a first indication of the second result of the one or more measurements performed by the wireless device on the first set of beams; and
  ii. the report including the first the second result of the determination, by the wireless device, that the at least two beams in the first set of beams are overlapping.

* * * * *